(12) United States Patent
Clevenger et al.

(10) Patent No.: US 12,453,348 B2
(45) Date of Patent: Oct. 28, 2025

(54) ANTIMICROBIAL WITH MODIFIED-CHITOSAN FUNCTIONALIZATION VIA DOPAMINE LINKAGE

(71) Applicant: Quatssant, LLC, Monmouth Junction, NJ (US)

(72) Inventors: Randell Clevenger, North Plainfield, NJ (US); Cheoljin Kim, North Brunswick, NJ (US); Kristin Blacklock, Holmdel, NJ (US)

(73) Assignee: Quatssant, LLC, Monmouth Junction, NJ (US)

( * ) Notice: Subject to any disclaimer, the term of this patent is extended or adjusted under 35 U.S.C. 154(b) by 0 days.

(21) Appl. No.: 17/869,064

(22) Filed: Jul. 20, 2022

(65) Prior Publication Data
US 2023/0025164 A1 Jan. 26, 2023

Related U.S. Application Data

(60) Provisional application No. 63/223,969, filed on Jul. 20, 2021.

(51) Int. Cl.
*A01N 43/16* (2006.01)
*A01N 57/34* (2006.01)
*C08B 37/08* (2006.01)

(52) U.S. Cl.
CPC ............ *A01N 43/16* (2013.01); *A01N 57/34* (2013.01); *C08B 37/003* (2013.01)

(58) Field of Classification Search
CPC ......... A01N 43/16; C08B 37/003; C08L 5/08; C08L 99/00; A01P 1/00
See application file for complete search history.

(56) References Cited

U.S. PATENT DOCUMENTS

| 2010/0113559 | A1 | 5/2010 | Park et al. |
| 2015/0150255 | A1 | 6/2015 | Lapitsky et al. |
| 2020/0404905 | A1* | 12/2020 | Clevenger ............ A01N 25/24 |
| 2021/0052766 | A1* | 2/2021 | Gannett ................ A61L 15/425 |

FOREIGN PATENT DOCUMENTS

| CN | 106178116 A | 12/2016 | |
| CN | 106237376 | 12/2016 | |
| CN | 110420350 A | 11/2019 | |
| CN | 111266280 A | 6/2020 | |
| JP | H0641202 | 2/1994 | |
| JP | H07324014 | 12/1995 | |
| JP | H08225601 | 9/1996 | |
| JP | 2009509021 | 3/2009 | |
| JP | 2012532935 | 12/2012 | |
| WO | WO-2007005792 A2 * | 1/2007 | ............ A61K 38/39 |
| WO | 2019133936 | 7/2019 | |
| WO | 2020263704 A1 | 12/2020 | |
| WO | WO-2021119855 A1 * | 6/2021 | ............ C09J 175/06 |
| WO | 2022020518 | 1/2022 | |
| WO | 2023003955 | 1/2023 | |

OTHER PUBLICATIONS

Liu, G. et al. In situ synthesis of multidentate PEGylated chitosan modified gold nanoparticles with good stability and biocompatibility, 2015, RSC Advances, vol. 5, pp. 70109-70116. (Year: 2015).*
Funahashi, R.; et al. "Molar Masses and Molar Mass Distributions of Chitin and Acid-Hydrolyzed Chitin" 2017, Biomacromolecules, vol. 18, pp. 4357-4363 (Year: 2017).*
Hoque, J.; et al. Chitosan Derivatives Active against Multidrug-Resistant Bacteria and Pathogenic Fungi: In Vivo Evaluation as Topical Antimicrobials 2016, Molecular Pharmaceutics, vol. 13, pp. 3578-3589. (Year: 2016).*
Rwei, S. P.; et al. "Synthesis and Rheological Characterization of Water-Soluble Glycidyltrimethylammonium-Chitosan" 2014, Marine Drugs, vol. 12, pp. 5547-5562 (Year: 2014).*
Clifford, A.; et al. "Biomimetically modified chitosan for electrophoretic deposition of composites" 2018, Colloids and Surfaces A, vol. 544, pp. 28-34. (Year: 2018).*
Cu, T. S.; et al. "Preparation of Silver Core-Chitosan Shell Nanoparticles Using Catechol-Functionalized Chitosan and Antibacterial Studies" 2014, Macromolecular Research, vol. 4, pp. 418-423. (Year: 2014).*
Zheng, Z.; et al. "Catechol modified quaternized chitosan enhanced wet adhesive and antibacterial properties of injectable thermosensitive hydrogel for wound healing" 2020, Carbohydrate Polymers, vol. 249, 116826. (Year: 2020).*
Sigma Aldrich Product 448877, Chitosan (Medium Molecular Weight). Accessed Jan. 9, 2024. (Year: 2024).*
Shin, M.; et al. "Complete prevention of blood loss with self-sealing haemostatic needles" 2017, Nature Materials, vol. 16, pp. 147-152. (Year: 2017).*
Chen, W.; et al. "Surface functionalization of titanium implants with chitosan-catechol conjugate for suppression of ROS-induced cells damage and improvement of osteogenesis" 2017, Biomaterials, vol. 114, pp. 82-96. (Year: 2017).*
Campelo, C. S.; et al. "Development, Validation, and Performance of Chitosan-Based Coatings Using Catechol Coupling" 2020, Macromolecular Bioscience, vol. 20, No. 1900253. (Year: 2020).*
Ren, L.; et al. "Preparation and characterization of the catechol functionalized chitosan-Ag NPs deposited onto titanium surface" Surface and Coating Technology 2021, vol. 420, No. 127319 (published online May 21, 2021). (Year: 2021).*
Fan, X.; et al. "Biomimetic Anchor for Surface-Initiated Polymerization from Metal Substrates" 2005, Journal of the American Chemical Society, vol. 127, pp. 15843-15847. (Year: 2005).*
Patel, S. S.; et al. "A comparison of Staphylococcus aureus biofilm formation on cobalt-chrome and titanium-alloy spinal implants" 2016, Journal of Clinical Neuroscience, vol. 31, pp. 219-223. (Year: 2016).*

(Continued)

*Primary Examiner* — Eric Olson
*Assistant Examiner* — Benjamin M Brandsen
(74) *Attorney, Agent, or Firm* — Schwegman Lundberg & Woessner, P.A.

(57) ABSTRACT

A composition comprising a doubly conjugated chitosan polymer or oligomer, and a functionalized metal work piece including the doubly conjugated chitosan polymer or oligomer.

16 Claims, 4 Drawing Sheets

(56) References Cited

OTHER PUBLICATIONS

Lih, E.; et al. "Optimal conjugation of catechol group onto hyaluronic acid in coronary stent substrate coating for the prevention of restenosis" 2016, Journal of Tissue Engineering, vol. 7, pp. 1-11. (Year: 2016).*
Sigma catalog entry for Low Molecular Weight Chitosan; Internet archive record from Jun. 13, 2021 (accessed Mar. 11, 2025). (Year: 2021).*
Mrowczynski et al., "Polydopamine—An Organocatalyst Rather than an Innocent Polymer," Chem. Eur. J., vol. 20, pp. 1-8 (2014).
Wei et al., "Polydopamine-assisted decoration of ZnO nanorods with Ag nanoparticles: an improved photoelectrochemical anode," J. Mater. Chem. A, vol. 1, pp. 5045-5052 (2013).
Wei et al., "Facile construction of a polydopamine-based hydrophobic surface for protection of metals against corrosion," RSC Adv, vol. 7, pp. 11528-11536 (2017).
Vunain et al., "Fundamentals of chitosan for biomedical applications," Chitosan Based Biomaterials, vol. 1: Fundamentals, Jennings et al., Ed., pp. 1-30 (2017).
Holowka et al., "Synthesis and Crosslinking of L-DOPA Containing Polypeptide Vesicles," Macromol. Biosci., vol. 10, pp. 496-502 (2010).
Jiang et al., "Antifouling and Antimicrobial Polymer Membranes Based on Bioinspired Polydopamine and Strong Hydrogen-Bonded Poly(N-vinyl pyrrolidone)," ACS Appl. Mater. Interfaces, vol. 5, pp. 12895-12904 (2013).
Kasprzak et al., "Properties and applications of flavonoid metal complexes," RSC Adv. DOI:10.1039/C5RA05069C; 24 pages (2015).
Kim et al., "Mussel-Inspired Block Copolymer Lithography for Low Surface Energy Materials of Teflon, Graphene, and Gold," Adv. Mater., vol. 23, pp. 5618-5622 (2011).
Lee et al., "Mussel-Inspired Surface Chemistry for Multifunctional Coatings," Science, vol. 318, pp. 426-430 (2007).
Li et al., "Hemocompatibility and anti-biofouling property improvement of poly(ethylene terephthalate) via self-polymerization of dopamine and covalent graft of zwitterionic cysteine," Colloids and Surfaces B: Biointerfaces, vol. 110, pp. 327-332 (2013).
Li et al., Synthesis of chitosan derivative with dual-antibacterial functional groups and its antibacterial activity, J. Appl. Polym. Sci., pp. 42663; 10 pages (2015).
Liang et al., "PDMS microchip coated with polydopamine/gold nanoparticles hybrid for efficient electrophoresis separation of amino acids," Electrophoresis, vol. 32, pp. 3331-3340 (2011).
Liaqat et al., "Chitooligosaccharides and their biological activities: A comprehensive Review," Carbohydrate Polymers, vol. 184, pp. 243-259 (2018).
Liu et al., "Dopamine-Melanin Colloidal Nanospheres: An Efficient Near-Infrared Photothermal Therapeutic Agent for In Vivo Cancer Therapy," Adv. Mater., vol. 25, pp. 1353-1359 (2013).
Lu et al., "In situ Synthesis of Silver Nanoparticles Uniformly Distributed on Polydopamine-Coated Silk Fibers for Antibacterial Application," Journal of Colloid and Interface Science, pp. 1-18 (2015).
Lynge et al., "Polydopamine/Liposome Coatings and Their Interaction with Myoblast Cells," ACS Appl. Mater. Interfaces, vol. 3, pp. 2142-2147 (2011).
Feng et al., "Paper-Based Triboelectric Nanogenerator and its Application in Self-Powered Anticorrosion and Antifouling," J. Mater. Chem. A, DOI:10.1039/C6TA07288G (2016).
Pardieu et al., "Polydopamine-coated open cell polyurethane foams as inexpensive, flexible yet robust catalyst support: proof of concept," Chem. Commun., DOI:10.1039/C6CC00847J (2016).
Freitas et al., "An Overview of Current Knowledge on the Properties, Synthesis and Applications of Quaternary Chitosan Derivatives," Polymers, vol. 12, p. 2878; 41 pages (2020).
Ryu et al., "Bio-inspired Adhesive Catechol-conjugated Chitosan for Biomedical Applications: A Mini Review," Acta Biomaterialia, 48 pages (2015).
Ryu et al., "Polydopamine Surface Chemistry: A Decade of Discovery," ACS Appl. Mater. Interfaces, vol. 10 pp. 7523-7540 (2018).
Sileika et al., "Antibacterial Performance of Polydopamine-Modified Polymer Surfaces Containing Passive and Active Components," ACS Appl. Mater. Interfaces, vol. 3, pp. 4602-4610 (2011).
Li et al.,"Synthesis and characterization of chitosan quaternary ammonium salt and its application as drug carrier for ribavirin," Drug Deliv., vol. 21(7), pp. 548-552 (2014).
Waite et al., "Polyphosphoprotein from the Adhesive Pads of Mytilus edulis," Biochemistry, vol. 40, No. 9, pp. 2887-2893 (2001).
Wang et al., "Self-Assembly of Catecholic Macroinitiator on Various Substrates and Surface-Initiated Polymerization," Langmuir, vol. 28 (5), pp. 2574-2581 (2012).
Wang et al., "Mussel Inspired Modification of Polypropylene Separators by Catechol/Polyamine for Li-Ion Batteries," ACS Appl. Mater. Interfaces, vol. 6, pp. 5602-5608 (2014).
Kahya, "Water Soluble Chitosan Derivatives and their Biological Activities: A Review," Polymer Sciences, vol. 5, No. 1:3, pp. 1-11 (2019).
Wu et al., "Polydopamine-assisted attachment of ?-cyclodextrin on porous electrospun fibers for water purification under highly basic condition," Chemical Engineering Journal, vol. 270, pp. 101-109 (2015).
Yang et al., "Polydopamine-mediated surface modification of scaffold materials for human neural stem cell engineering," Biomaterials, vol. 33, pp. 6952-6964 (2012).
Yu et al., "Experimental and theoretical analysis of polymerization reaction process on the polydopamine membranes and its corrosion protection properties for 304 Stainless Steel," Journal of Molecular Structure, vol. 982, pp. 152-161 (2010).
Zhang et al., "Mussel inspired polydopamine functionalized poly(ether ether ketone) tube for online solid-phase microextraction-high performance liquid chromatography and its application in analysis of protoberberine alkaloids in at plasma," Journal of Chromatography A, vol. 1278, pp. 29-36 (2013).
Zhang et al., "Polydopamine-Coated Porous Substrates as a Platform for Mineralized #-FeOOH Nanorods with Photocatalysis under Sunlight," ACS Appl. Mater. Interfaces, vol. 7(21), pp. 11567-11574 (2015).
International Search Report and Written Opinion issued Nov. 16, 2022 in Application No. PCT/US2022/037721.
International Search Report and Written Opinion issued Dec. 10, 2021 in Application No. PCT/US2021/042640.
International Preliminary Report on Patentability issued Jan. 18, 2024 in International Application No. PCT/US2022/037721.
Lunkov, et al. "Synthesis of silver nanoparticles using gallic acid-conjugated chitosan derivatives", Carbohydrate Polymers, 2020, vol. 234, 115916, https://doi.org/10.1016/j.carbpol.2020.115916.
Sun, L., et al. "Preparation, characterization and antimicrobial activity of quaternized carboxymethyl chitosan and application as pulp-cap", Polymer, vol. 47, Issue 6, Mar. 8, 2006, pp. 1796-1804, https://doi.org/10.1016/j.polymer.2006.01.073.
Qin, et al., "Cationic chitosan derivatives as potential antifungals: A review of structural optimization and applications" Carbohydrate Polymers, vol. 236, May 15, 2020, 116002, https://doi.org/10.1016/j.carbpol.2020.116002.
"Japanese Application Serial No. 2023-504502, Notification of Reasons for Refusal mailed Feb. 25, 2025", w English Translation, 9 pgs.
"Indian Application Serial No. 202317011406, First Examination Report mailed Sep. 24, 2024", 8 pgs.
"International Application Serial No. PCT US2021 042640, International Preliminary Report on Patentability mailed Feb. 2, 2023", 9 pgs.
"Chinese Application Serial No. 202180059064.7, Office Action mailed Mar. 31, 2025", w English Translation, 26 pgs.

(56) References Cited

OTHER PUBLICATIONS

"Japanese Application Serial No. 2023-504502, Response filed May 26, 2025 to Notification of Reasons for Refusal mailed Feb. 25, 2025", w English Claims, 17 pgs.

* cited by examiner

ANTIMICROBIAL WITH MODIFIED-CHITOSAN FUNCTIONALIZATION VIA DOPAMINE LINKAGE

CROSS REFERENCE TO RELATED APPLICATIONS

The present application claims the benefit of U.S. Provisional Patent Application 63/223,969 filed 20 Jul. 2021; which is incorporated herein by reference in its entirety for all purposes.

FIELD

The present disclosure is directed to methods and compositions for use of dopamine, polydopamine, and/or their derivatives, in multipart chitosan conjugates and as attachment motifs for surface modification.

BACKGROUND

Bacterial contamination of surfaces is a continuing problem both in the medical and nonmedical fields. Surfaces with colonized bacteria can cause sickness and even death. Various surface treatment compositions and processes have been developed to improve the antibacterial properties of such surfaces. Modification of surfaces using various chemical techniques, such as using organothiol-metals, enediol-oxides, silane-oxides, phosphonic acids and derivatives, and the like, have been previously developed. Surface modifications generally encompass the inclusion of an active end group anchored to the modified surface via a linking group. The active end group provides the desired functionality to the modified surface.

Polydopamine is one of the most versatile and widely used motifs for surface functionalization. Inspired by the study of marine bivalves, particularly mussels and their ability to bind to a large variety of surfaces, early researchers noted the preponderance of catechol (3,4-dihydroxybenzene) in the form of 3,4-dihydroxy-L-phenylalanine (DOPA) and primary and secondary amines in the form of lysine and histidine in mussel adhesive proteins. Early catechol/amine systems were used to craft biomimetic adhesion systems including DOPA-Lys polyamino acids, and catechol tethered to polyamines such as chitosan.

Chitosan is a natural polysaccharide obtained from the partial or full deacetylation of chitin. As described by Dutta et. al. (Chitin and chitosan: chemistry, properties and applications, J. Sci. Ind. Res., vol. 63, pp. 20-31 (2004)), chitin is the most naturally abundant polysaccharide after cellulose. It exists as a mixed polymer of glucosamine and N-acylated glucosamine monomers and is characterized by the degree of deacetylation of the C-2 amine. By convention chitosan is defined as having >50% deacetylation. The degree of deacetylation (DDA) along with chain length and molecular weight are key determinants of the chemical and physical behavior of chitosan. A glucosamine monomeric unit of chitosan has the following structure, where n is the number of monomeric units present in an oligomer or polymer:

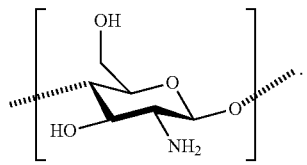

Each monomeric unit has three readily available sites for chemical modification—the C-2 primary amine, the C-3 secondary —OH and the C-6 primary —OH. These sites allow for easy modification and customization of chitosan for biomedical applications. In addition, chitosan is biocompatible, biodegradable and its degradation products do not cause inflammatory reactions.

Chitosan has wide applications in the medical field, for example as vehicles for drug delivery, tissue engineering, as antithrombogenic agents, in bone regeneration and as antimicrobial material. Additionally, chitosan has been used in cosmetics, wastewater treatment and as a feed and food additive. Other applications of chitosan are described at, for example, Vunain et al. Fundamentals of Chitosan for Biomedical Applications (Chitosan Based Biomaterials: Volume 1: Fundamentals, Jennings, J. A., Bumgardner, J. D. ed., pp. 3-30 (2017).

Antimicrobial chitosan is well known in the art and has been recently reviewed. (Freitas et al., *An Overview of Current Knowledge on the Properties, Synthesis and Applications of Quaternary Chitosan Derivatives*, Polymers, vol. 12 (12), p. 2878 (2020)). Although unmodified chitosan is weakly antimicrobial, installation of quaternary ammonium moieties enhances both the antimicrobial potency of chitosan and its water solubility. Chitosan is insoluble in neutral to basic aqueous conditions.

The most common quaternization involves N,N, N-trimethyl chitosan followed closely by N-[(2-hydroxy-3-trimethyl ammonium) propyl] chitosan, commonly known as HTCC. Insertion of phosphonium and pyridinium salts is also increasingly common.

In addition to enhanced solubility and antimicrobial potency, mucoadhesiveness and permeability are significantly improved by the installation of permanently cationic sites on the polymer or oligomer chain.

An inventive aspect of the current application is the construction of compositions comprising quaternized chitosan polymers or oligomers, which are further modified by attachment of dopamine or an analog to form three-part conjugates.

A second inventive aspect is the further modification of these conjugates through attachment to/reaction with metals, their alloys, oxides or nanoparticle forms and methods to effect said attachment.

The methods currently used for dopamine deposition often require long soaks in aqueous buffers under basic conditions. An exemplary embodiment of this application is directed to compositions comprising doubly conjugated chitosan polymers or oligomers, where the conjugates are quaternary ammonium, phosphonium or pyridinium compounds attached to at least some of the available reaction sites (—NH$_2$, —OH) of the chitosan molecules, followed by attachment of dopamine or an analog thereof to at least some of the remaining available sites of the chitosan molecules.

Another exemplary embodiment of this application is directed to compositions obtained by the attachment of these doubly modified chitosans to surfaces through their pendant catechol (or analog) groups. Such surfaces may include metals, their alloys, oxides or nanoparticles, ceramics, metalloids, polymers etc.

SUMMARY

Applicants have developed fast and efficient anodic deposition methods in aqueous or organic media under basic or neutral conditions and the attachment of chitosan conjugates with pendant catechols, modified catechols and analogs including dopamine to metal and metal oxide surfaces.

Anodic deposition provides a relentlessly oxidative environment at the dopamine (DP)/surface interface analogous to the addition of chemical oxidants used to accelerate dopamine attachment and polymerization. This method stands in contrast to other electrodeposition techniques, which use lower voltages and cycle between oxidative and reductive conditions at the DP/surface interface.

Additionally, chitosan conjugates are bound to metal and/or metal oxide surfaces through heat whether conventionally applied in an oven or through microwave radiation or by induction.

Photografting has also been employed to bind quaternized doubly modified chitosan conjugates through their pendant catechol or analog groups.

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

While certain aspects of conventional technologies have been discussed to facilitate disclosure of the invention, the inventors of this application in no way disclaim these technical aspects, and it is contemplated that the claimed invention may encompass or include one or more of the conventional technical aspects discussed herein.

None of the known methods of surface functionalization includes a process of bonding a chitosan and/or modified chitosan of this specification to metallic surfaces via a dopamine or dopamine derivative linker to render them bactericidal. In the area of medical devices, eluting systems have potentially systemic effects and can engender resistance in bacterial organisms whereas a bound antimicrobial surface would not have these drawbacks. As for nonmedical surfaces, a bound surface treatment potentially persists longer and has a longer window of efficacy versus commonly applied washes. The subject application describes unique compositions and fast and convenient processes for creating an antimicrobial surface based on a natural product which would have a high likelihood of being biocompatible. Furthermore, the method for modifying a polydopamine polymer described herein does not require the use of particular derivatives of dopamine or of particular pre-synthesized compounds and the implementation of different stages.

Such modified surfaces may be used in various applications, including, but not limited to, medical devices.

An inventive aspect of this application aims to address the drawbacks associated with conventional methods for attaching dopamine, polydopamine, and related compounds, to a metallic surface. This application also addresses novel coatings and novel devices that include a modified surface.

An exemplary embodiment is a method of preparing a modified-metal surface by attaching a catechol or derivative thereof to a surface of a metal, the method comprising: preparing an aqueous solution of the catechol or derivative thereof in a buffer, including but not limited to, a phosphate buffer; immersing at least a portion of a metal work piece into the aqueous solution of the catechol or derivative thereof; supplying a voltage or UV radiation for a duration of time to obtain a functionalized metal work piece; and chemically attaching a quaternized chitosan to the functionalized metal work piece.

Another exemplary embodiment is a method of preparing a metal surface modified by attachment of a catechol or derivative thereof-containing quaternized chitosan double conjugate, the method comprising: preparing an aqueous solution of the chitosan or derivative thereof in a buffer, including but not limited to, a phosphate buffer; immersing at least a portion of a metal work piece into the aqueous solution of the chitosan or derivative thereof; supplying a voltage or UV radiation for a duration of time to obtain a functionalized metal work piece; providing a chemically attached modified chitosan to the metal work piece.

In another embodiment of preparing a modified-metal surface with an attached catechol or derivative thereof to a surface of a metal, the method comprises: preparing a solution of a catechol or derivative thereof in a non-aqueous protic solvent in the presence of a base, immersing at least a portion of a metal work piece into the solution of the catechol or derivative thereof; supplying a voltage or UV radiation for a duration of time; to obtain a functionalized metal work piece; and chemically attaching a modified chitosan to the functionalized metal work piece.

In another exemplary embodiment of preparing a modified-metal surface with an attached chitosan or derivative thereof to a surface of a metal, the method comprises: preparing a solution of a doubly conjugated chitosan or derivative thereof in a non-aqueous protic solvent in the presence of a base, immersing at least a portion of a metal work piece into the solution of the chitosan or derivative thereof; supplying a voltage or UV radiation for a duration of time to obtain a functionalized metal work piece with chemically attached modified chitosan to the metal work piece.

In another exemplary embodiment, the non-aqueous protic solvent comprises any organic solvent, including but not limited to, an alcohol. The alcohol may be selected from, but is not limited to, methanol, ethanol, propanol, butanol, and the like.

In another exemplary embodiment, the base may be any organic basis that is miscible with an organic solvent.

In another exemplary embodiment, the base may be piperidine.

In another exemplary embodiment, the metal work piece covered by a thin layer of a doubly conjugated chitosan in an aqueous or non-aqueous solution may be exposed to ultraviolet light or heat, to form the functionalized metal work piece.

In another exemplary embodiment, the process includes exposure to ultraviolet light (photografting), where the metal work piece covered by a thin layer of a doubly conjugated chitosan in a non-aqueous protic solvent is exposed to UV radiation having a wavelength ($\lambda_{max}$) of about 100 to about 400 nm. In another exemplary embodiment, the wavelength may be about 100 nm, about 125 nm, about 150 nm, about 175 nm, about 200 nm, about 225 nm, about 250 nm, about 251 nm, about 252 nm, about 253 nm, about 254 nm, about 255 nm, about 256 nm, about 257 nm, about 258 nm, about 259 nm, about 260 nm, about 275 nm, about 300 nm, about 325 nm, about 350 nm, about 375 nm, about 400 nm, or any wavelength between about 100 nm to about 400 nm.

In another exemplary, the photografting may be carried out for a time of about 0.1 second to about 10 minutes. In another exemplary embodiment, the photografting may be carried out for a time of about 0.1 sec, about 0.5 sec, about 1 sec, about 5 sec, about 10 sec, about 15 sec, about 20 sec, about 25 sec, about 30 sec, about 35 sec, about 40 sec, about 45 sec, about 50 sec, about 55 sec, about 60 sec, about 2 min, about 3 min, about 4 min, about 5 min, about 6 min, about 7 min, about 8 min, about 9 min, about 10 min, or any time between about 0.1 seconds and about 10 minutes.

In another exemplary embodiment, the catechol or derivative thereof is covalently bonded to a surface of the functionalized metal work piece.

In another exemplary embodiment, a surface of the dopamine or derivative thereof-functionalized metal work piece is activated by the addition a diimidazole a derivative thereof or any reagent designed and used to couple, bind or attach molecules, oligomers, or polymers to each other.

In another exemplary embodiment, the coupling agent is N-(3-Dimethylaminopropyl)-N'-ethylcarbodiimide hydrochloride (EDCI).

In another exemplary embodiment, the metal-linked chitosan-dopamine or analog conjugate is further modified by the attachment of a quaternary ammonium, pyridinium or phosphonium compound.

In another exemplary embodiment, the catechol or derivative thereof, includes any substituted or unsubstituted catechols, which may be represented by the following formula:

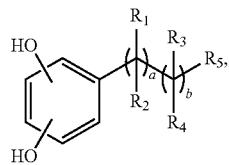

wherein each of $R_1$, $R_2$, $R_3$, $R_4$ and $R_5$ is independently selected from the group consisting of a thiol, a primary amine, a secondary amine, a nitrile, an aldehyde, an imidazole, an azide, a halide, a polyhexamethylene dithiocarbonate, a hydrogen, a hydroxyl, a carboxylic acid, an aldehyde, a carboxylic ester or a carboxamide, provided at least one of $R_1$, $R_2$, $R_3$, $R_4$ and $R_5$ is not a hydrogen atom, wherein a ranges from 0 to 10 and b ranges from 0 to 10, provided that a or b is at least 1. The catechol or derivative thereof may include, but is not limited to catecholamines, phenolic aldehydes, tyrosol and derivatives thereof, including hydroxyl-, methoxy- and mixed methoxy-hydroxy derivatives of tyrosol, tyramines, and derivatives thereof, including hydroxylated tyramines, dopamines and derivatives thereof, and the like. In another exemplary embodiment, other hydroxyl-containing compounds, including but not limited to phenols, both substituted and unsubstituted, may be used as the linker. In another exemplary embodiment, the catechol or derivative thereof is dopamine or polydopamine. In another exemplary embodiment, the dopamine derivative may be the methoxy derivative, the 4-ethanol derivative, and the like.

In another exemplary embodiment, the doubly conjugated chitosan may be represented by the following formula:

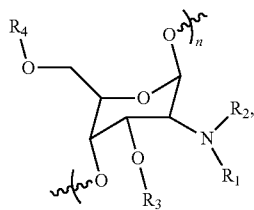

wherein each of $R_1$, $R_2$, $R_3$, $R_4$ is independently selected from the group consisting of a thiol, an alkane, an alkene, an alkyne, a secondary amine, a nitrile, an aldehyde, an imidazole, an azide, a halide, a polyhexamethylene dithiocarbonate, a hydrogen, a hydroxyl, a carboxylic acid, an aldehyde, a carboxylic ester, an acetyl, carboxamide and a urea, provided at least one of $R_1$, $R_2$, $R_3$, $R_4$ is not a hydrogen atom. In the above formula, n represents the number of monomeric units in the chitosan chain and can range from about 1 to about 500. The C-2 nitrogen must be at least 50% deacetylated by the definition for chitosan and each monomeric unit may be attached to one of the two conjugation moieties.

The most likely attachment point for the conjugates is at the deacetylated amines with secondary attachment at the C-3 and C-5 hydroxyls less likely. In the doubly conjugated chitosan, one conjugate will react with a subset of available deacetylated monomers while the second conjugate will react with a subset of the remaining unconjugated, deacetylated monomers.

The chitosan may undergo a deacetylation reaction such that about 50% to about 100%, about 55% to about 95%, about 60% to about 90%, about 65% to about 85%, about 70% to about 80%, or any time between about 50% to about 100%, of the acetyl groups may be removed, and further, at least two of the groups $R_1$-$R_6$ may be modified.

At least one of the groups $R_1$-$R_4$ may contain a quaternary ammonium, phosphonium or pyridinium functional group, and the chitosan may have between about 1% to about 99%, about 5% to about 90%, about 10% to about 80%, about 15% to about 75%, about 20% to about 70%, about 25% to about 65%, about 30% to about 60%, about 35% to about 55%, about 40% to about 50% quaternization, or any percentage between about 1% to about 99%.

At least one of the groups $R_1$-$R_6$ may be a catechol analog providing a pendant dihydroxy benzyl group for potential immobilization onto a substrate.

In another exemplary embodiment, the metal is a non-ferrous metal. In another exemplary embodiment, the metal is selected from, but not limited to, Ti, Zr, Hf, V, Nb, Ta, Al, Co, W, Mg, and alloys, oxides and nanoparticle forms thereof. In another exemplary embodiment, the metal is selected from, but not limited to, titanium, titanium oxides, titanium alloys, aluminum, aluminum oxides and aluminum alloys. In another exemplary embodiment, the metal is stainless steel.

In another exemplary embodiment, the concentration of the solution of the catechol or derivative thereof is from about 0.1% to about 20% by weight. In another exemplary embodiment, the concentration of the solution of the catechol or derivative thereof is about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, or any percentage between about 0.1% and about 20%.

In another exemplary embodiment, the voltage applied may range from about 1 V to about 100 V. In another exemplary embodiment, the voltage applied may the voltage applied may be about 1 V, about 2 V, about 3 V, about 4 V, about 5 V, about 6 V, about 7 V, about 8 V, about 9 V, about 10 V, about 11 V, about 12 V, about 13 V, about 14 V, about 15 V, about 16 V, about 17 V, about 18 V, about 19 V, about 20 V, about 21 V, about 22 V, about 23 V, about 24 V, about 25 V, about 26 V, about 27 V, about 28 V, about 29 V, about 30 V, about 31 V, about 32 V, about 33 V, about 34 V, about 35 V, about 36 V, about 37 V, about 38 V, about 39 V, about 40 V, about 41 V, about 42 V, about 43 V, about 44 V, about 45 V, about 46 V, about 47 V, about 48 V, about 49 V, about 50 V, about 51 V, about 52 V, about 53 V, about 54 V, about 55 V, about 56 V, about 57 V, about 58 V, about 59 V, about 60 V, about 61 V, about 62 V, about 63 V, about 64 V, about 65 V, about 66 V, about 67 V, about 68 V, about 69 V, about 70 V, about 71 V, about 72 V, about 73 V, about 74 V, about 75 V, about 76 V, about 77 V, about 78 V, about 79 V, about 80 V, about 81 V, about 82 V, about 83 V, about 84 V, about 85 V, about 86 V, about 87 V, about 88 V, about 89 V, about 90 V, about 91 V, about 92 V, about 93 V, about 94 V, about 95 V, about 96 V, about 97 V, about 98 V, about 99 V, about 100 V, or any voltage between about 1 V and about 100 V.

In another exemplary embodiment, the duration of time is from about 1 second to about 60 minutes. In another exemplary embodiment, the duration of time is about 1 second, about 5 seconds, about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 65 seconds, about 70 seconds, about 75 seconds, about 80 seconds, about 85 seconds, about 90 seconds, about 95 seconds, about 100 seconds, about 105 seconds, about 110 seconds, about 115 seconds, about 120 seconds, about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, about 15 minutes, about 16 minutes, about 17 minutes, about 18 minutes, about 19 minutes, about 20 minutes, about 21 minutes, about 22 minutes, about 23 minutes, about 24 minutes, about 25 minutes, about 26 minutes, about 27 minutes, about 28 minutes, about 29 minutes, about 30 minutes, about 35 minutes, about 40 minutes, about 45 minutes, about 50 minutes, about 55 minutes, about 60 minutes, or any duration of time between about 1 second and about 20 minutes, about 30 minutes, or any duration of time between about 1 second and about 30 minutes, about 60 minutes, or any duration of time between about 1 second and about 60 minutes.

In another exemplary embodiment, the pH of the aqueous buffer is about 6.0 to about 9.5, about 6.0 to about 6.5, about 6.5 to about 7.0, about 7.0 to about 7.5, about 7.5 to about 8.0, about 8.0, about 8.5, about 9, about 9.5, or any pH between about 6.0 and about 9.5, or any range between about 6.0 and about 9.5.

In another exemplary embodiment, the dopamine solution comprises from about 1 wt. % to about 50 wt % dopamine with about 1 wt. % to about 20 wt % piperidine in ethanol or methanol, preferably from about 5 wt % to about 45 wt % dopamine with about 5 wt % to about 15 wt % piperidine, from about 10 wt % to about 40 wt % dopamine with about 10 wt % to about 15 wt % piperidine, or any amount of dopamine from about 1 wt % to about 50 wt % dopamine with about 1 wt % to about 20 wt % piperidine within these ranges, including the end point of these ranges.

In another exemplary embodiment, ultraviolet radiation is applied for from about 1 minute to about 60 minutes, from about 5 minutes to about 55 minutes, from about 10 minutes to about 50 minutes, from about 15 minutes to about 45 minutes, from about 20 minutes to about 40 minutes, from about 25 minutes to about 35 minutes, or any time between about 1 minute to about 60 minutes, or any time less than about 3 hours, including the end points of these ranges.

In another exemplary embodiment, heat is applied for from about 30 minutes to about 1 hour, from about 1 hour to about 2 hours, from about 2 hours to about 4 hours, from about 4 hours to about 6 hours, from about 6 hours to about 8 hours from about 8 hours to about 10 hours, or any time between 30 minutes to 10 hours, including the end points of these ranges.

In another exemplary embodiment, the modified chitosan solution comprises oligo-chitosan.

In another exemplary embodiment, the oligo-chitosan may be modified at the C-2 amine by addition of quaternary ammonium, phosphonium or pyridinium compounds, and the modified chitosan may be further modified at the C-6 hydroxyl, C-3 hydroxyl or previously unreacted C-2 amines by attachment of dopamine (polydopamine) through which it is immobilized onto a surface.

In another exemplary embodiment, the oligo-chitosan may be modified at the C-2 amine by addition of quaternary ammonium, phosphonium or pyridinium compounds, and the modified chitosan may be further modified at the C-6 hydroxyl, C-3 hydroxyl or previously unreacted C-2 amines by attachment of 3,4-dihydroxy hydrocinnamic acid through which it is immobilized onto a surface.

In another exemplary embodiment the modified chitosan solution comprises oligo-chitosan modified at the glucosamine monomers with a quaternary phosphonium compound.

In another exemplary embodiment the modified chitosan solution comprising oligo-chitosan is modified with quaternary phosphonium conjugation at available sites, the degree of conjugation being about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 100%, from about 5% to about 10%, from about 10% to about 15%, from about 15% to about 20%, from about 20% to about 25%, from about 25% to about 30%, from about 30% to about 40%, from about 40% to about 50%, from about 50% to about 60%, from about 60% to about 70%, from about 70% to about 80%, from about 80% to about 90%, from about 90% to about 100%, or any value within these ranges, including the end points of these ranges.

In another exemplary embodiment the modified chitosan solution comprising quaternized oligo-chitosan further modified with dopamine or analogs thereof at available remaining sites, the degree of conjugation being about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 100%, from about 5% to about 10%, from about 10% to about 15%, from about 15% to about 20%, from about 20% to about 25%, from about 25% to about 30%, from about 30% to about 40%, from about 40% to about 50%, from about 50% to about 60%, from about 60% to about 70%, from about 70% to about 80%, from about 80% to about 90%, from about 90% to about 100%, or any value within these ranges, including the end points of these ranges.

In another exemplary embodiment, the modified chitosan solution comprises oligo-chitosan modified at the glucosamine monomers with a quaternary ammonium compound.

In another exemplary embodiment the modified chitosan solution comprising oligo-chitosan modified with quaternary ammonium, phosphonium or pyridinium groups at available sites, wherein the percentage of available sites is about 1%, about 2%, about 3%, about 4%, about 5%, from about 5 to about 10%, from about 10% to about 15%, from about 15% to about 20%, from about 20% to about 25%, from 25% to about 30%, from about 30% to about 40%, from about 40% to about 50%, from about 50% to about 60%, from about 60% to about 70%, from about 70% to about 80%, from about 80% to about 90%, from about 90% to about 100%, or any value within these ranges, including the end points of these ranges.

In another exemplary embodiment the modified chitosan solution comprising quaternized chitosan additionally modified with dopamine or its analogs thereof, wherein the dopamine or its analogs are conjugated to the modified chitosan at remaining sites available for conjugation, and the percentage of available sites (not conjugated to quaternary ammonium, phosphonium or pyridinium groups) is about 1%, about 2%, about 3%, about 4%, about 5%, from about 5 to about 10%, from about 10% to about 15%, from about 15% to about 20%, from about 20% to about 25%, from 25% to about 30%, from about 30% to about 40%, from about 40% to about 50%, from about 50% to about 60%, from about 60% to about 70%, from about 70% to about 80%, from about 80% to about 90%, from about 90% to about 100%, or any value within these ranges, including the end points of these ranges.

In another exemplary embodiment the oligo-chitosan or modified oligo-chitosan is about 5 monomers in length, from about 5 to about 10 monomers in length, from about 10 to about 20 monomers in length, from about 20 to about 30 monomers in length, from about 30 to about 40 monomers in length, from about 40 to about 50 monomers in length, from about 50 to about 60 monomers in length, from about 60 to about 70 monomers in length, from about 70 to about 80 monomers in length, from about 80 to about 90 monomers in length, from about 90 to about 100 monomers in length, from about 100 to about 200 monomers in length, from about 200 to about 300 monomers in length, from about 300 to about 400 monomers in length, from about 400 to about 500 monomers in length, or any value within these ranges, including the end points of these ranges.

In another exemplary embodiment, the method further comprises a method of preparing the modified chitosan-containing solution.

In another exemplary embodiment, the method of preparing the modified chitosan-containing solution comprises: (a) preparing an aqueous solution of chitosan in acetic acid and hydrogen peroxide; (b) heating the aqueous solution of chitosan; (c) adjusting the pH of the aqueous solution of chitosan to a pH=9; and (d) collecting the oligo-chitosan product.

In another exemplary embodiment, the weight average molecular weight of the oligo-chitosan is from about 100 to about 5000. In another exemplary embodiment, the weight average molecular weight of the oligo-chitosan is about 100, about 200, about 300, about 400, about 500, about 600, about 700, about 800, about 900, about 1000, about 1100, about 1200, about 1300, about 1400, about 1500, about 1600, about 1700, about 1800, about 1900, about 2000, about 2100, about 2200, about 2300, about 2400, about 2500, about 2600, about 2700, about 2800, about 2900, about 3000, about 3100, about 3200, about 3300, about 3400, about 3500, about 3600, about 3700, about 3800, about 3900, about 4000, about 4100, about 4200, about 4300, about 4400, about 4500, about 4600, about 4700, about 4800, about 4900, about 5000, or any weight average molecular weight between about 100 and about 5000.

In another exemplary embodiment, the pH of the aqueous solution of chitosan is from about 7.5 to about 10. In another exemplary embodiment, the pH of the aqueous solution of chitosan is about 7.5, about 8, about 8.5, about 9, about 9.5, about 10, or any pH between about 7.5 and about 10.

In another exemplary embodiment, a quaternized chitosan may be prepared by addition of glycidyl trimethylammonium chloride, to enable a permanent quaternary ammonium functionality. Alternatively, the quaternized molecules may be attached to the chitosan monomer's C-2 amine; alternate molecules may be attached to the same location for additional functionality; different attachment chemistries may be used between the chitosan and the linker, and the like.

In another exemplary embodiment, a quaternized chitosan is further modified by conjugation with dopamine or its analogs thereof.

In another exemplary embodiment, a dopamine or its analog-linked quaternized chitosan is attached to a metal, its alloy, oxide or nanoparticle form.

In another exemplary embodiment, a metal-, alloy-, oxide-, or nanoparticle-bound dopamine or its analog thereof-linked chitosan or oligo-chitosan may be quaternized by conjugation with a quaternary ammonium, pyridinium or phosphonium compound.

In another exemplary embodiment, any of the solutions described herein may include a solvent that is selected from, but not limited to, methanol, ethanol, tetrahydrofuran (THF), demethylformamide (DMF), and mixtures thereof.

Details of other exemplary embodiments of the present disclosure will be included in the following detailed description and the accompanying drawings.

DETAILED DESCRIPTION

Figure 1:
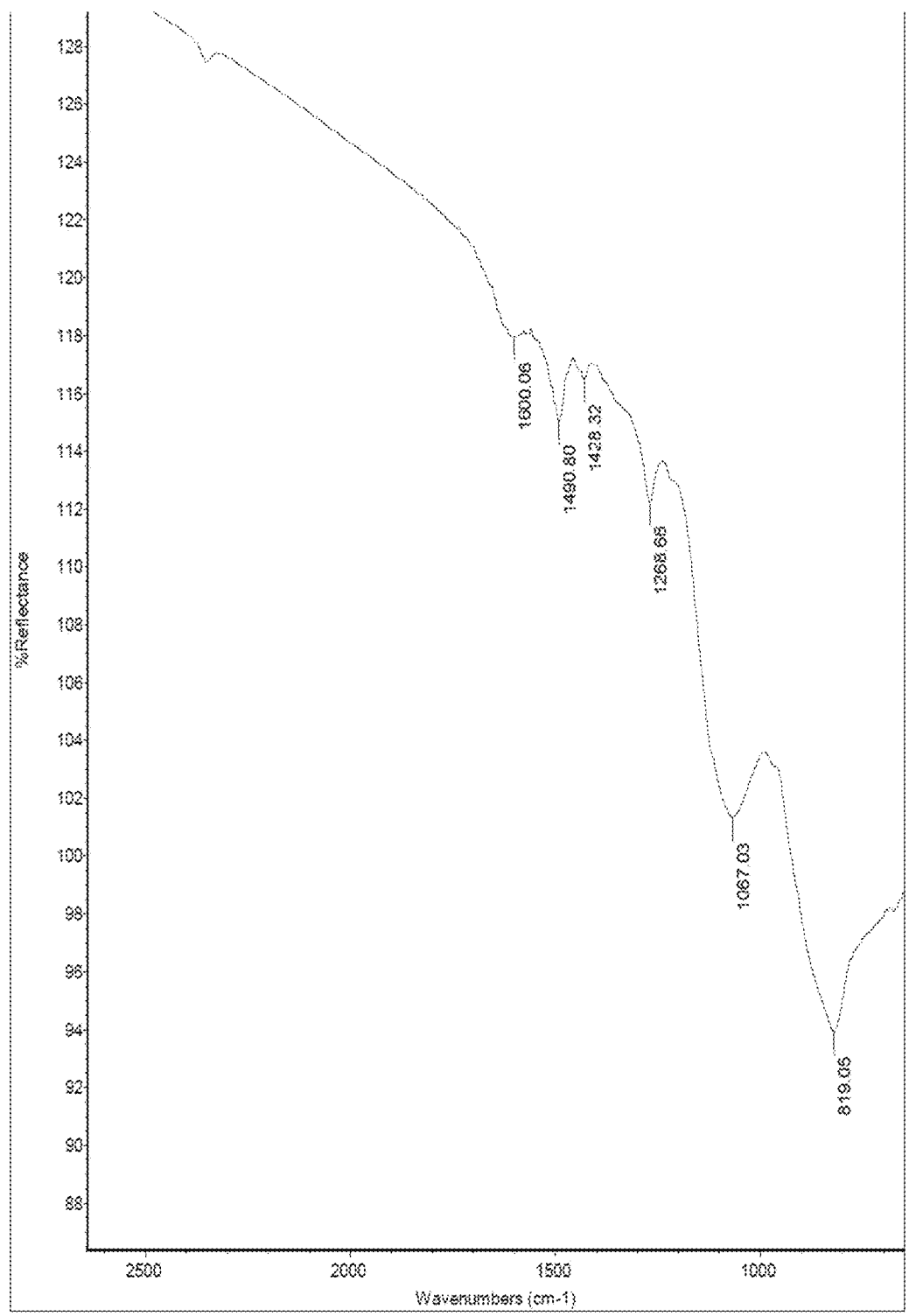
FIG. 1 is an infrared spectrum of a dopamine/polydopamine-modified metallic surface according to an exemplary embodiment.

Advantages and features of the present disclosure, and methods for accomplishing the same will be more clearly understood from exemplary embodiments described below with reference to the accompanying drawings. However, the present disclosure is not limited to the following exemplary embodiments and may be implemented in different forms. The exemplary embodiments are provided only to complete disclosure of the present disclosure and to fully provide a person having ordinary skill in the art to which the present disclosure pertains with the category of the invention, and the present disclosure will be defined by any appended claims and combinations thereof.

Shapes, sizes, ratios, angles, numbers, and the like shown in the accompanying drawings are merely exemplary, and the present disclosure is not limited thereto. Like reference numerals generally denote like elements throughout the present specification. Further, in the following description, a detailed explanation of well-known related technologies may be omitted to avoid unnecessarily obscuring the subject matter of the present disclosure. Terms such as "including," "having," "comprising," and "consisting of" used herein are generally intended to allow other components to be included unless the terms are used in conjunction with the term "only." Any references to the singular may include the plural unless expressly stated otherwise.

Components are interpreted to include an ordinary error range even if not expressly stated. For example, with respect to the embodiments described herein, an error range of up to plus or minus ten percent (+10%) would be considered an ordinary error range.

As used herein, the singular forms "a," "an" and "the" are intended to include the plural forms as well, unless the context clearly indicates otherwise. Additionally, the use of "or" is intended to include "and/or," unless the context clearly indicates otherwise.

When the positional relation between two parts is described using the terms such as "on," "above," "below," and "next," one or more parts may be positioned between the two parts unless the terms are used in conjunction with the term "immediately" or "directly."

When an element or layer is referred to as being "on" another element or layer, the element or layer may be directly on the other element or layer, or intervening elements or layers may be present.

Although the terms "first," "second," and the like are used for describing various components, these components are not confined by these terms. These terms are merely used for distinguishing one component from the other components, and a first component may be a second component in a technical concept of the present disclosure.

The size and thickness of each component illustrated in the drawings are represented for convenience of explanation, and the drawings are not necessarily to scale.

Whenever a numerical range is indicated herewith, it is meant to include any cited numeral (fractional or integral) within the indicated range. The phrases "ranging/ranges between" a first indicated number and a second indicated number and "ranging/ranges from" a first indicated number "to" a second indicated number are used herein interchangeable and are meant to include the first and second indicated numbers and all fractional and integral numerals therebetween.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "10%" is intended to mean "about 10%."

Numbers and/or numerical ranges preceded by the term "about" should not be considered to be limited to these recited ranges. Rather, numbers and/or numerical ranges preceded by the term "about" should be understood to include a range accepted by those skilled in the art for any given element in formations according to the subject invention.

The features of various embodiments of the present disclosure can be partially or entirely bonded to or combined with each other and can be interlocked and operated in various technical ways, and the embodiments can be carried out independently of, or in association with, each other.

Hereinafter, various exemplary embodiments of the present disclosure will be described in detail with reference to the accompanying drawings.

An exemplary embodiment is a method of preparing a modified-metal surface by attaching a catechol or derivative thereof to a surface of a metal, the method comprising: preparing an aqueous or a non-aqueous protic solution of the catechol or derivative thereof in a buffer or organic solvent; adjustment to basic pH or addition of a base; immersing at least a portion of a metal work piece into the solution of the catechol or derivative thereof; supplying a voltage such that the work piece is the anode in an electrochemical circuit for a duration of time to obtain a functionalized metal work piece; and chemically attaching a modified chitosan to the functionalized metal work piece.

An exemplary embodiment is a method of preparing a modified-metal surface by attaching a doubly modified chitosan or derivative thereof to a surface of a metal, the method comprising: preparing an aqueous or a non-aqueous protic solution of the chitosan or derivative thereof in a buffer or organic solvent; adjustment to basic pH or addition of a base; immersing at least a portion of a metal work piece into the solution of the doubly modified chitosan or derivative thereof; supplying a voltage such that the work piece is the anode in an electrochemical circuit for a duration of time to obtain a functionalized metal work piece.

An exemplary embodiment is a method of preparing a modified-metal surface by attaching a catechol or derivative thereof-modified chitosan or derivative thereof to a surface of a metal, the method comprising: preparing an aqueous or a non-aqueous protic solution of the modified chitosan or derivative thereof in a buffer or organic solvent; adjustment to basic pH or addition of a base; immersing at least a portion of a metal work piece into the solution of the modified chitosan or derivative thereof; supplying a voltage such that the work piece is the anode in an electrochemical circuit for a duration of time to obtain a functionalized metal work piece and chemically attaching a quaternary ammonium, pyridinium or phosphonium molecule to obtain a functionalized metal work piece.

Another exemplary embodiment is a method of preparing a modified-metal surface by attaching a catechol or derivative thereof to a surface of a metal, the method comprising: preparing an aqueous or a non-aqueous protic solution of the catechol or derivative thereof in a buffer or organic solvent; adjustment to basic pH or addition of a base; spraying so as to cover the surface of the metal workpiece and exposing the workpiece to ultraviolet light for a duration of time so as to insure chemical attachment to the workpiece to create a functionalized metal workpiece and chemically attaching a modified chitosan to the functionalized metal workpiece.

Another exemplary embodiment is a method of preparing a modified-metal surface by attaching a doubly modified chitosan or derivative thereof to a surface of a metal, the method comprising: preparing an aqueous or a non-aqueous protic solution of the chitosan or derivative thereof in a buffer or organic solvent; adjustment to basic pH or addition of a base; spraying so as to cover the surface of the metal workpiece and exposing the workpiece to ultraviolet light for a duration of time so as to insure chemical attachment to the workpiece to create a functionalized metal workpiece.

Another exemplary embodiment is a method of preparing a modified-metal surface by attaching a catechol or derivative-modified chitosan or derivative thereof to a surface of a metal, the method comprising: preparing an aqueous or a non-aqueous protic solution of the modified chitosan or derivative thereof in a buffer or organic solvent; adjustment to basic pH or addition of a base; spraying so as to cover the surface of the metal workpiece and exposing the workpiece to ultraviolet light for a duration of time so as to insure chemical attachment to the workpiece to create a functionalized metal workpiece and chemically attaching a quaternary ammonium, pyridinium or phosphonium molecule to the functionalized metal workpiece.

Another exemplary embodiment is a method of preparing a modified metal surface by attaching a modified chitosan or derivative thereof to the surface of a metal, the method comprising: preparing an aqueous or non-aqueous solution of a doubly modified chitosan to which has been attached a quaternary ammonium, pyridinium or phosphonium compound and a catechol or derivative thereof, spraying said solution onto the metal surface so as to cover it and baking in an oven with sufficient time and temperature to affect chemical attachment of the quaternized chitosan conjugate to the surface.

Another exemplary embodiment is a method of preparing a modified metal surface by attaching a modified chitosan or derivative thereof to the surface of a metal, the method comprising: preparing an aqueous or non-aqueous solution of a doubly modified chitosan to which has been attached a quaternary ammonium, pyridinium or phosphonium compound and a catechol or derivative thereof, spraying said solution onto the metal surface so as to cover it and exposing the surface to ultraviolet light for sufficient time to affect chemical attachment of the quaternized chitosan conjugate to the surface.

Another exemplary embodiment is a method of preparing a modified metal surface by attaching a modified chitosan or derivative thereof to the surface of a metal, the method comprising: preparing an aqueous or non-aqueous solution of a doubly modified chitosan to which has been attached a quaternary ammonium, pyridinium or phosphonium compound and a catechol or derivative thereof, immersing a metal workpiece into the solution and placing it in contact with the anode of an electrochemical cell. Submersing a cathode and applying a voltage sufficient to effect chemical attachment of the chitosan conjugate to the metal workpiece.

In another exemplary embodiment, the catechol or derivative thereof is covalently bonded to a surface of the functionalized metal work piece.

In another exemplary embodiment, the catechol or derivative thereof-functionalized work piece is activated by the addition of coupling agents know to those in the art to effect carbon-carbon bond formation, carbon-oxygen bond formation, carbon-sulfur bond formation, carbon-nitrogen bond formation, carbon-phosphorous bond formation, carbon-silicon bond formation and the like and to effect attachment or immobilization of additional functional chemical entities such as modified and unmodified chitosan oligomers.

In another exemplary embodiment, the fully formed chitosan conjugates are attached to a metal, alloy, oxide or nanoparticle surface.

In another exemplary embodiment, the catechol or derivative thereof, includes any substituted or unsubstituted catechols, which may be represented by the following formula:

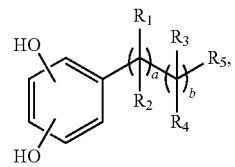

wherein each of $R_1$, $R_2$, $R_3$, $R_4$ and $R_5$ is independently selected from the group consisting of a thiol, a primary amine, a secondary amine, a nitrile, an aldehyde, an imidazole, an azide, a halide, a polyhexamethylene dithiocarbonate, a hydrogen, a hydroxyl, a carboxylic acid, an aldehyde, a carboxylic ester or a carboxamide, provided at least one of $R_1$, $R_2$, $R_3$, $R_4$ and $R_5$ is not a hydrogen atom, wherein a ranges from 0 to 10 and b ranges from 0 to 10, provided that a or b is at least 1. The catechol or derivative thereof may include, but is not limited to catecholamines, phenolic aldehydes, tyrosol and derivatives thereof, including hydroxyl-, methoxy- and mixed methoxy-hydroxy derivatives of tyrosol, tyramines, and derivatives thereof, including hydroxylated tyramines, dopamines and derivatives thereof, and the like. In another exemplary embodiment, other hydroxyl-containing compounds, including but not limited to phenols, both substituted and unsubstituted, may be used as the linker. In another exemplary embodiment, the catechol or derivative thereof is dopamine or polydopamine. In another exemplary embodiment, the dopamine derivative may be the methoxy derivative, the 4-ethanol derivative, and the like.

In another exemplary embodiment, the metal is a non-ferrous metal, and may include their respective oxides, alloys and nanoparticle forms. The metal may include, but is not limited to, titanium, and its oxides and alloys, aluminum, and its oxides and alloys, vanadium, and its oxides and alloys, zirconium, and its oxides and alloys, hafnium, and its oxides and alloys, niobium, and its oxides and alloys, tantalum, and its oxides and alloys, tungsten, and its oxides and alloys, magnesium, and its oxides and alloys, stainless steel, cobalt chrome, and the like. However, the material to which the catechol, or derivative thereof, is attached is not limited, and may include polymers, biological polymers, ceramics, and the like.

In another exemplary embodiment, the concentration of the solution of the catechol or derivative thereof is from about 0.1% to about 20% by weight. In another exemplary embodiment, the concentration of the solution of the catechol or derivative thereof is about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, or any percentage between about 0.1% and about 20%.

In another exemplary embodiment, the voltage applied may range from about 1 V to about 100 V. In another exemplary embodiment, the voltage applied may the voltage applied may be about 1 V, about 2 V, about 3 V, about 4 V, about 5 V, about 6 V, about 7 V, about 8 V, about 9 V, about 10 V, about 11 V, about 12 V, about 13 V, about 14 V, about 15 V, about 16 V, about 17 V, about 18 V, about 19 V, about 20 V, about 21 V, about 22 V, about 23 V, about 24 V, about 25 V, about 26 V, about 27 V, about 28 V, about 29 V, about 30 V, about 31 V, about 32 V, about 33 V, about 34 V, about 35 V, about 36 V, about 37 V, about 38 V, about 39 V, about 40 V, about 41 V, about 42 V, about 43 V, about 44 V, about 45 V, about 46 V, about 47 V, about 48 V, about 49 V, about 50 V, about 51 V, about 52 V, about 53 V, about 54 V, about 55 V, about 56 V, about 57 V, about 58 V, about 59 V, about 60 V, about 61 V, about 62 V, about 63 V, about 64 V, about 65 V, about 66 V, about 67 V, about 68 V, about 69 V, about 70 V, about 71 V, about 72 V, about 73 V, about 74 V, about 75 V, about 76 V, about 77 V, about 78 V, about 79 V, about 80 V, about 81 V, about 82 V, about 83 V, about 84 V, about 85 V, about 86 V, about 87 V, about 88 V, about 89 V, about 90 V, about 91 V, about 92 V, about 93 V, about 94 V, about 95 V, about 96 V, about 97 V, about 98 V, about 99 V, about 100 V, or any voltage between about 1 V and about 100 V.

In another exemplary embodiment, voltage is applied for a duration of time from about 1 second to about 60 minutes. In another exemplary embodiment, the duration of time is about 1 second, about 5 seconds, about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 65 seconds, about 70 seconds, about 75 seconds, about 80 seconds, about 85 seconds, about 90 seconds, about 95 seconds, about 100 seconds, about 105 seconds, about 110 seconds, about 115 seconds, about 120 seconds, about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, about 15 minutes, about 16 minutes, about 17 minutes, about 18 minutes, about 19 minutes, about 20 minutes, about 25 minutes, about 30 minutes, about 35 minutes, about 40 minutes, about 45 minutes, about 50 minutes, about 55 minutes, about 60 minutes, or any duration of time between about 1 second and about 60 minutes.

In another exemplary embodiment, the pH of the buffer is about 7.5, about 8.0, about 8.5, about 9, about 9.5, or any pH between about 7.5 and about 9.5.

In another exemplary embodiment, the method further comprises cleaning and drying of the functionalized surface.

In another exemplary embodiment, the method further comprises drying of the functionalized surface under vacuum or under an inert or non-reactive atmosphere. In another exemplary embodiment, the inert atmosphere is nitrogen or argon.

In another exemplary embodiment, the functionalized metal work piece in the imidazole solution is stirred for about 1 hour to about 10 hours. In another exemplary embodiment, the stirring is carried out for about 1 hour, about 1.5 hours, about 2 hours, about 2.5 hours, about 3 hours, about 3.5 hours, about 4 hours, about 4.5 hours, about 5 hours, about 5.5 hours, about 6 hours, about 6.5 hours, about 7 hours, about 7.5 hours, about 8 hours, about 8.5 hours, about 9 hours, about 9.5 hours, about 10 hours, or any duration of time between about 1 hour and 10 hours.

In another exemplary embodiment, the modified chitosan solution comprises oligo-chitosan.

In another exemplary embodiment, the oligo-chitosan may be modified at the C-2 amines of the monomer units thereof by addition of quaternary ammonium, pyridinium or phosphonium compounds, and modified chitosan may be further modified at the C-6 hydroxyl, the C-3 hydroxyl or C-2 amines by attachment of dopamine (polydopamine) or analogs thereof through which it is immobilized onto a surface.

In another embodiment the modified chitosan solution comprises oligo-chitosan modified at the glucosamine monomers with a quaternary phosphonium compound.

In another embodiment the modified chitosan solution comprising oligo-chitosan modified with quaternary phosphonium conjugation at available sites the degree of conjugation being about 1%, about 2%, about 3%, about 4%, about 5%, from about 5 to about 10%, from about 10% to about 15%, from about 15% to about 20%, from about 20% to about 25%, from 25% to about 30%, from about 30% to about 40%, from about 40% to about 50%, from about 50% to about 60%, from about 60% to 70%, from about 70% to about 80%, from about 80% to about 90%, from about 90% to about 100%, or any value within these ranges, including the end points of these ranges.

In another embodiment, the modified chitosan solution comprises oligo-chitosan modified at the glucosamine monomers with a quaternary ammonium, phosphonium or pyridinium compound.

In another embodiment the modified chitosan solution comprising oligo-chitosan modified with quaternary ammonium, phosphonium or pyridinium conjugation at available sites the degree of which is about 1%, about 2%, about 3%, about 4%, about 5%, from about 5 to about 10%, from about 10% to about 15%, from about 15% to about 20%, from about 20% to about 25%, from 25% to about 30%, from about 30% to about 40%, from about 40% to about 50%, from about 50% to about 60%, from about 60% to about 70%, from about 70% to about 80%, from about 80% to about 90%, from about 90% to about 100%, or any value within these ranges, including the end points of these ranges.

In another embodiment the oligo-chitosan or modified oligo-chitosan is about 5 monomers in length, from about 5 to about 10 monomers in length, from about 10 to about 20 monomers in length, from about 20 to about 30 monomers in length, from about 30 to about 40 monomers in length, from about 40 to about 50 monomers in length, from about 50 to about 60 monomers in length, from about 60 to about 70 monomers in length, from about 70 to about 80 monomers in length, from about 80 to about 90 monomers in length, from about 90 to about 100 monomers in length, from about 100 to about 200 monomers in length, from about 200 to about 300 monomers in length, from about 300 to about 400 monomers in length, from about 400 to about 500 monomers in length, or any value within these ranges, including the end points of these ranges.

In another exemplary embodiment, the method further comprises a method of preparing the modified chitosan-containing solution.

In another exemplary embodiment, the method of preparing the modified chitosan-containing solution comprises: (a) preparing an aqueous solution of chitosan in acetic acid and hydrogen peroxide; (b) heating the aqueous solution of chitosan; (c) adjusting the pH of the aqueous solution of chitosan to a pH=9; and (d) collecting the oligo-chitosan product.

In another exemplary embodiment, the weight average molecular weight of the oligo-chitosan is from about 100 to about 5000. In another exemplary embodiment, the weight average molecular weight of the oligo-chitosan is about 100, about 200, about 300, about 400, about 500, about 600, about 700, about 800, about 900, about 1000, about 1100, about 1200, about 1300, about 1400, about 1500, about 1600, about 1700, about 1800, about 1900, about 2000, about 2100, about 2200, about 2300, about 2400, about 2500, about 2600, about 2700, about 2800, about 2900, about 3000, about 3100, about 3200, about 3300, about 3400, about 3500, about 3600, about 3700, about 3800, about 3900, about 4000, about 4100, about 4200, about 4300, about 4400, about 4500, about 4600, about 4700, about 4800, about 4900, about 5000, or any weight average molecular weight between about 100 and about 5000.

In another exemplary embodiment, the pH of the aqueous solution of chitosan is from about 7.5 to about 10. In another exemplary embodiment, the pH of the aqueous solution of chitosan is about 7.5, about 8, about 8.5, about 9, about 9.5, about 10, or any pH between about 7.5 and about 10.

In another exemplary embodiment, a quaternized chitosan may be prepared by addition of glycidyl trimethylammonium chloride, to enable a permanent quaternary ammonium functionality. Alternate quaternized molecules may be attached to the chitosan monomer's C-2 amine, C-3 hydroxyl or C-6 hydroxyl; alternate molecules may be attached to the same location for additional functionality; different attachment chemistries may be used to immobilize the modified oligo-chitosan to the functionalized surface, and the like.

In another exemplary embodiment, any of the solutions described herein may include a solvent selected from, but not limited to, methanol, ethanol, tetrahydrofuran (THF), demethylformamide (DMF), and mixtures thereof.

Catechol is a phenol derivative that includes an additional hydroxyl group, and has the following chemical structure:

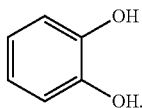

Dopamine is a substituted catechol having an ethylamine group as a substituent, and has the following chemical structure:

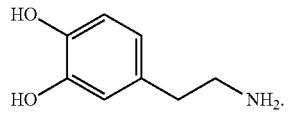

Catechol, and catechol derivatives such as dopamine, attach to metal surfaces by forming covalent bonds with the ring oxygens. The dangling amine branch of the dopamine can then stabilize the attached molecule by participating in dopamine polymerization to form polydopamine on the surface. Some amines are available to be further reacted with desired molecules to impart surface functionality. The utility of such molecules is that they can contain functional groups which can be further modified. This allows for the installation of a variety of chemistries onto the distal end of these molecules. Thus, covalent attachment of these molecules followed by installation of custom chemistries is tantamount to the covalent attachment of said chemistries onto the surface.

Such functional groups may include, but are not limited to, a substituted or unsubstituted hydroxyl, a substituted or unsubstituted amine, a substituted or unsubstituted ester, a substituted or unsubstituted thiol, a substituted or unsubstituted ether, a substituted or unsubstituted phosphonic acid ester, a substituted or unsubstituted phosphinic acid ester, a substituted or unsubstituted phosphoric acid ester, a substituted or unsubstituted carboxylate, a substituted or unsubstituted acrylate, a substituted or unsubstituted sulfonate, a substituted or unsubstituted sulfinate, a substituted or unsubstituted sulfoxide, a substituted or unsubstituted silane, a substituted or unsubstituted siloxane, a substituted or unsubstituted polydimethylsiloxane (PDMS), a substituted or unsubstituted amino ester, a substituted or unsubstituted peptide, both natural and synthetic, a substituted or unsubstituted oligopeptide, proteins, nucleotides, oligonucleotides, polynucleotides, a substituted or unsubstituted sugar, a substituted or unsubstituted polysaccharide, and the like, and these groups may be further modified. The functional group may be an ester, such as a methacrylate, a urethane, a urea, an alkyl halide, and the like.

Manipulating the chemical presentation of a surface to the environment changes the behavior of that surface when compared to an untreated surface. For example, surfaces can be made to be hydrophobic, hydrophilic, oleophobic, lubricious, antimicrobial, and the like. Surfaces may also be made to either enhance or attenuate the effectiveness of adhesives. Further, proteins and protein fragments, amino acids (both natural and synthetic), and peptides may be attached to enhance or attenuate a desired physical, chemical or biological response.

As described in the exemplary embodiments of this application, successful surface modification depends on the choice of linker and binding chemistry. While several binding strategies for both metallic and non-metallic surfaces have been developed, the focus is on the use of modified catechols, primarily dopamine or 3,4-dihydroxy hydrocinnamic acid, as linkers of choice. Catechols, or derivatives thereof, are attractive for the ubiquity of surfaces to which it can be applied and its ease of further modification.

In some embodiments dopamine or polydopamine is covalently bonded to metallic surfaces, which leaves the amine moieties of the dopamine molecule available on the surface for further functionalization. Urethane or urea formation was chosen as the binding chemistry to attach modified chitosan to the polydopamine. Even though many of the amines attached to dopamine monomers participate in dopamine polymerization, a sufficient number remain available for further surface modification. In the experiments described herein, carbonyl diimidazole (CDI) in methylene chloride was chosen for the activation chemistry to allow the activated amine of dopamine to couple with the C-6 hydroxyl or unreacted C-2 amines of the modified chitosan. Other, more environmentally benign coupling chemistries can be used.

The final step in the process is attachment of modified chitosan to the CDI-activated polydopamine surface. The modified chitosan (HTCC) is coupled to the CDI-activated polydopamine surface to impart antimicrobial properties to the surface. The most likely point of attachment is shown to be C-2 amines that did not become quaternized in the formation of HTCC. This completes the construction of a compositionally unique antimicrobial surface.

A first schematic representation of the modification process described herein is as follows:

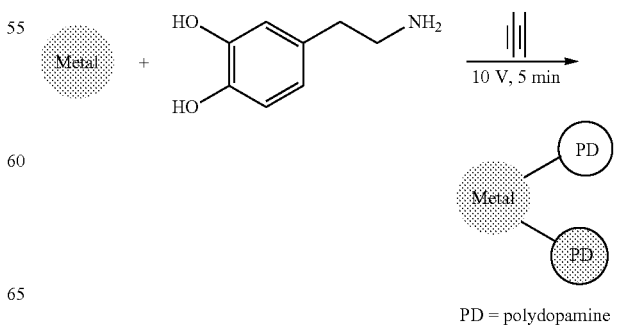

PD = polydopamine

-continued

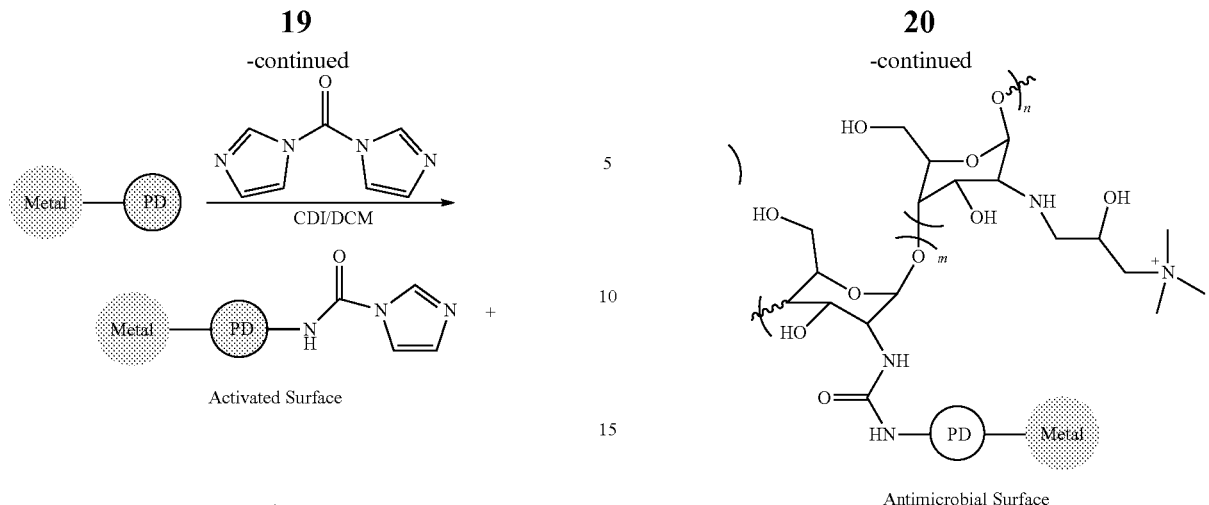

Activated Surface

Quaternized Chitosan (HTCC)

-continued

Antimicrobial Surface

In the graphic above, n represents the number of quaternized monomeric units numbering from about 1 to about 500 and m represents the number of remaining deacetylated unquaternized monomeric units attached to the dopamine surface from about 1 to about 500.

The first schematic representation above is provided for clarity and should not be construed to be limited to quaternized positions that alternate with dopamine attachment points in a regular pattern, but may also include different chemical environments of the C-2 amines of the chitosan monomers that are randomly distributed between quaternized, dopamine-attached, acetylated and deacetylated sites.

A second schematic further elucidates another exemplary embodiment of this application:

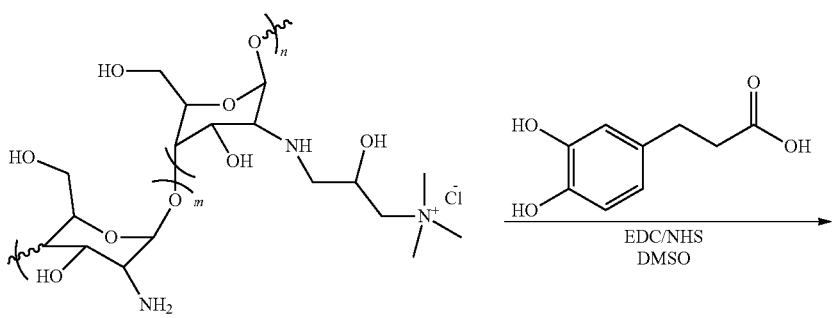

Quaternized Chitosan (HTCC)

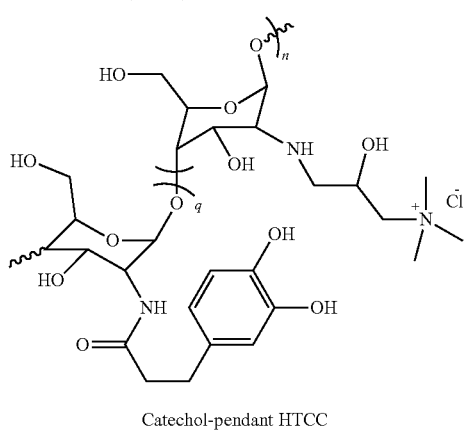

Catechol-pendant HTCC

-continued

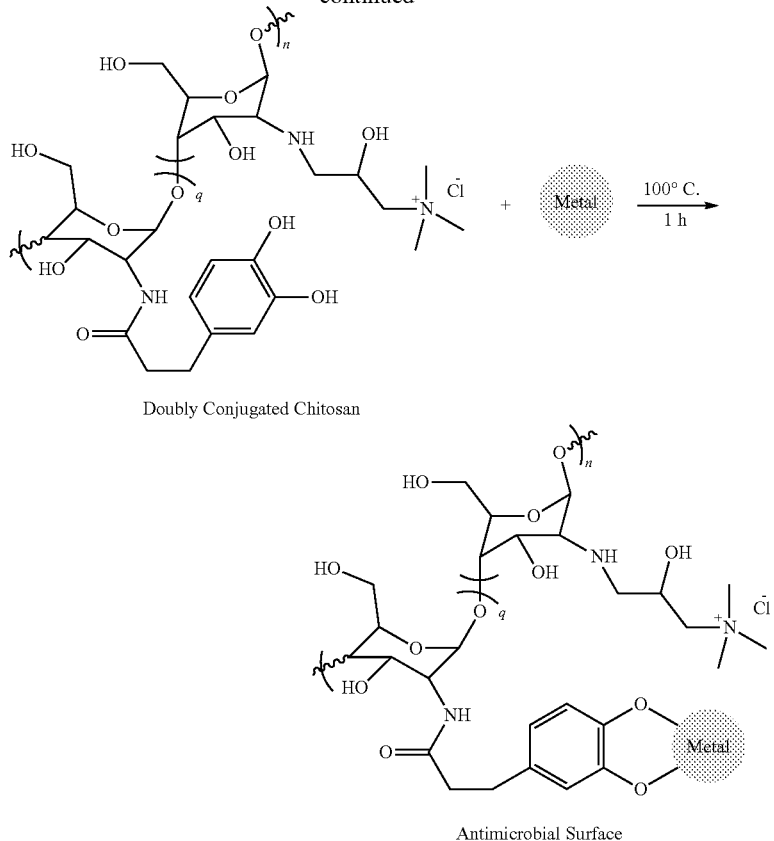

Doubly Conjugated Chitosan

Antimicrobial Surface

In the above schematic representation, n represents the number of quaternized monomeric units from about 1 to about 500, m represents the number of unquaternized, deacetylated monomeric units available for conjugation from about 1 to about 500, and q represents the number of catechol-derivatized monomeric units from about 1 to about 500.

The second schematic representation above is provided for clarity and should not be construed as being limited to quaternized positions that alternate with cinnamic acid attachment points in a regular pattern, but may also include different chemical environments of the C-2 amines of the chitosan monomers that are randomly distributed between quaternized, cinnamic acid-attached, acetylated and deacetylated sites.

In this example, the fully formed doubly conjugated chitosan is synthesized prior to immobilization onto a metal surface. The catechol-pendant HTCC can be isolated and stored until needed adding to the convenience of this method. HTCC can be synthesized as described above and in the literature. The second conjugation couples HTCC to 3,4-dihydroxy hydrocinnamic acid via the well know EDC/NHS coupling to form an amide linkage.

Immobilization to a metal surface can be achieved by the methods previously described, i.e., baking, anodization or photografting.

The prepared workpiece is then analyzed using standard analysis techniques, including, but not limited to, infrared (IR) spectroscopy, contact angle, X-ray Photoelectron Spectroscopy (XPS), Energy-Dispersive X-ray Spectroscopy (EDX), Atomic Force Microscopy (AFM), Time-of-Flight Secondary Ion Mass Spectrometry (Tof-SIMS), Coefficient of Friction (COF) studies, and combinations thereof.

EXAMPLES

The functionalization of metallic surfaces using dopamine as a linking group is described in the examples that follow. The process described herein leads to highly potent surfaces providing, against some organisms, greater than 5 logs of killing versus control while maintaining excellent biocompatibility.

Example 1: Modification of Metallic Surfaces with Dopamine

A 1 wt % aqueous solution of dopamine in pH=8.5 phosphate buffer was prepared and clean commercially pure (CP) titanium coupons were immersed in the buffer. Each coupon was arranged to be in contact with the anodic terminal of a DC power supply. A voltage of 10 V was applied for 5 mins. The coupons were then removed and sonicated in water for 15 mins. The sonication process was repeated, following which the coupons were rinsed in copious amounts of water. This was followed by further sonication for 5 min in ethanol, followed by rinsing in ethanol. The coupons were dried, and the surfaces thereof studied using infrared (IR) spectroscopy. An IR spectrum of a surface modified using the above-described process is shown in FIG. 1.

The spectrum in FIG. 1 shows characteristic broad peaks centered around about 1600 cm$^{-1}$ and 1490 cm$^{-1}$ indicative of combinations of C=C and N=C stretching vibrations.

Broad peaks indicate vibrating species existing in many different chemical environments, indicative of polymers. The peaks at about 1428 cm$^{-1}$ and about 1268 cm$^{-1}$ are indicative of C=C and CNC functionality.

Example 2: Photografting Dopamine onto Titanium Surface

A solution of dopamine (10 mg/ml) in a phosphate buffer (pH=8.5) was prepared. The solution was sprayed onto the surface of clean dry titanium coupons so as to cover their surfaces. The coupons were then exposed to UV radiation (lambda max=254 nm) for 5 minutes followed by two more applications of sprayed solution and exposure. The treated coupons were then rinsed and sonicated in water for 15 minutes followed by rinsing with EtOH. They were dried under argon. Infrared spectra of a treated coupon is shown in FIG. 2 which demonstrated that polydopamine was on the surface.

Figure 2:
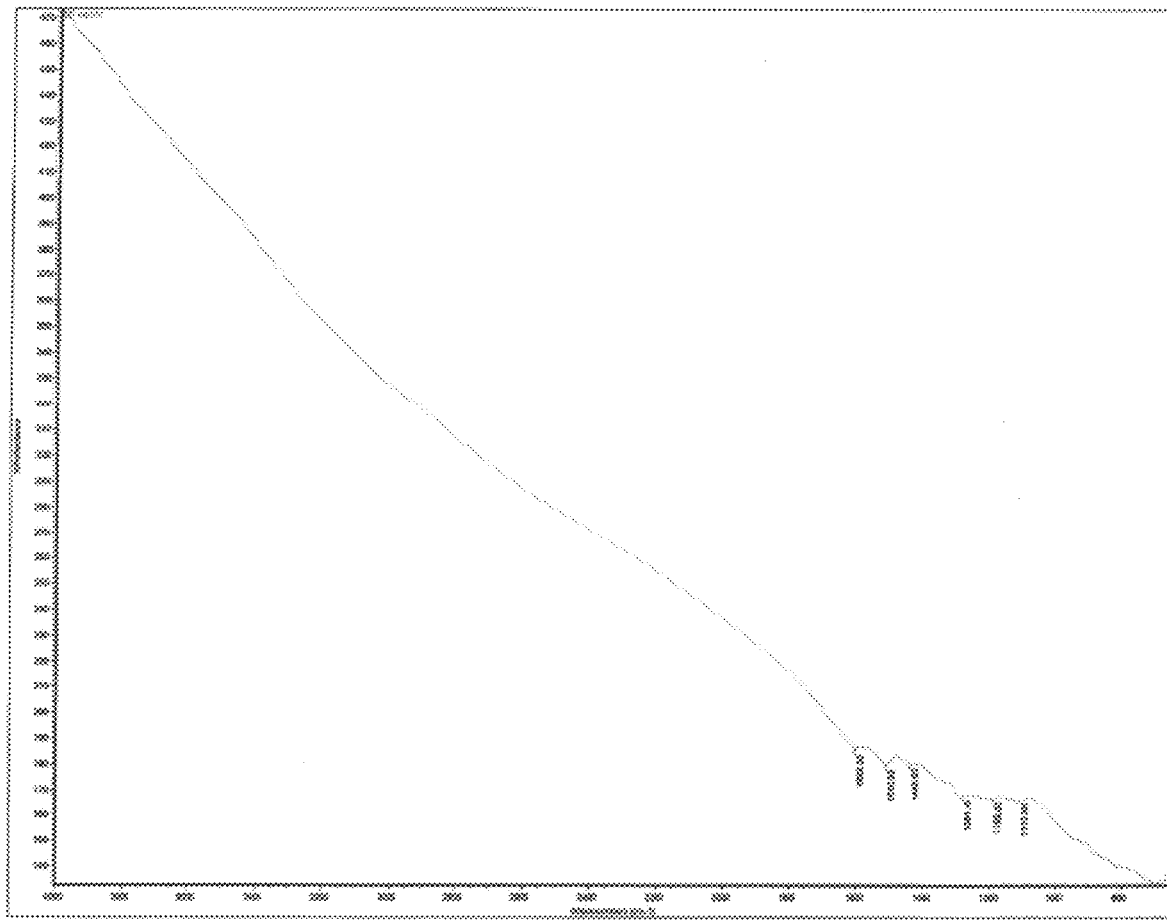
FIG. 2 is an infrared spectrum of dopamine/polydopamine-modified metallic surface bound by application of ultraviolet radiation.

The spectrum in FIG. 2 shows characteristic broad peaks centered around about 1600 cm$^{-1}$ and 1490 cm$^{-1}$ indicative of combinations of C=C and N=C stretching vibrations. Broad peaks indicate vibrating species existing in many different chemical environments, indicative of polymers. The peaks at about 1443 cm$^{-1}$ are indicative of C=C and CNC functionality.

Example 3: CDI-Activation of Dopamine-Modified Metallic Surfaces

The metallic coupons with dopamine attached to the surface thereto were immersed in a solutions of 250 ml CH$_2$Cl$_2$ and 3 g CDI, and stirred for 4 hours at room temperature at a stirring rate of 400 rpm to 500 rpm. The coupons were removed from the CH$_2$Cl$_2$/CDI solution and rinsed with acetone, followed by sonication in acetone for 10 min. The rinsing processing was repeated. The coupons were then dried under vacuum.

Example 4: Attachment of Chitosan Oligomers

The final step in the process is attachment of modified chitosan to the CDI-activated polydopamine surface. The modified chitosan (N-4 or HTCC) is prepared in-house by depolymerizing chitosan (average MW=50000, dd≥90%) by heating in an aqueous acetic acid/hydrogen peroxide solution. The product of the depolymerization reaction was crashed out of a pH=9 solution, washed and isolated. The isolated product is an oligo-chitosan having an average MW of about 2000. The isolated oligo-chitosan was quaternized via a reaction between the C-2 amine of the glucosamine monomers and glycidyl trimethylammonium chloride to yield the modified chitosan product. This product is then coupled to the CDI-activated polydopamine surface.

A 1 wt % solution of N-4 in DMSO was prepared. Coupons with the CDI-activated polydopamine surfaces were laid flat in an array and sprayed with the N-4/DMSO solution, and heated for about 10 minutes at 100° C. The coupons were flipped over, and the process was then repeated. The entire process was repeated for at least two spray/heat cycles for each side. After the final spraying step, the modified coupons were heated for about 4 hours at about 100° C., followed by sonication in ethanol for 10 minutes. The characteristics of the surface after attachment of the modified chitosan was confirmed with infrared (IR) spectroscopy. The resulting IR spectrum is shown in FIG. 3.

Figure 3:
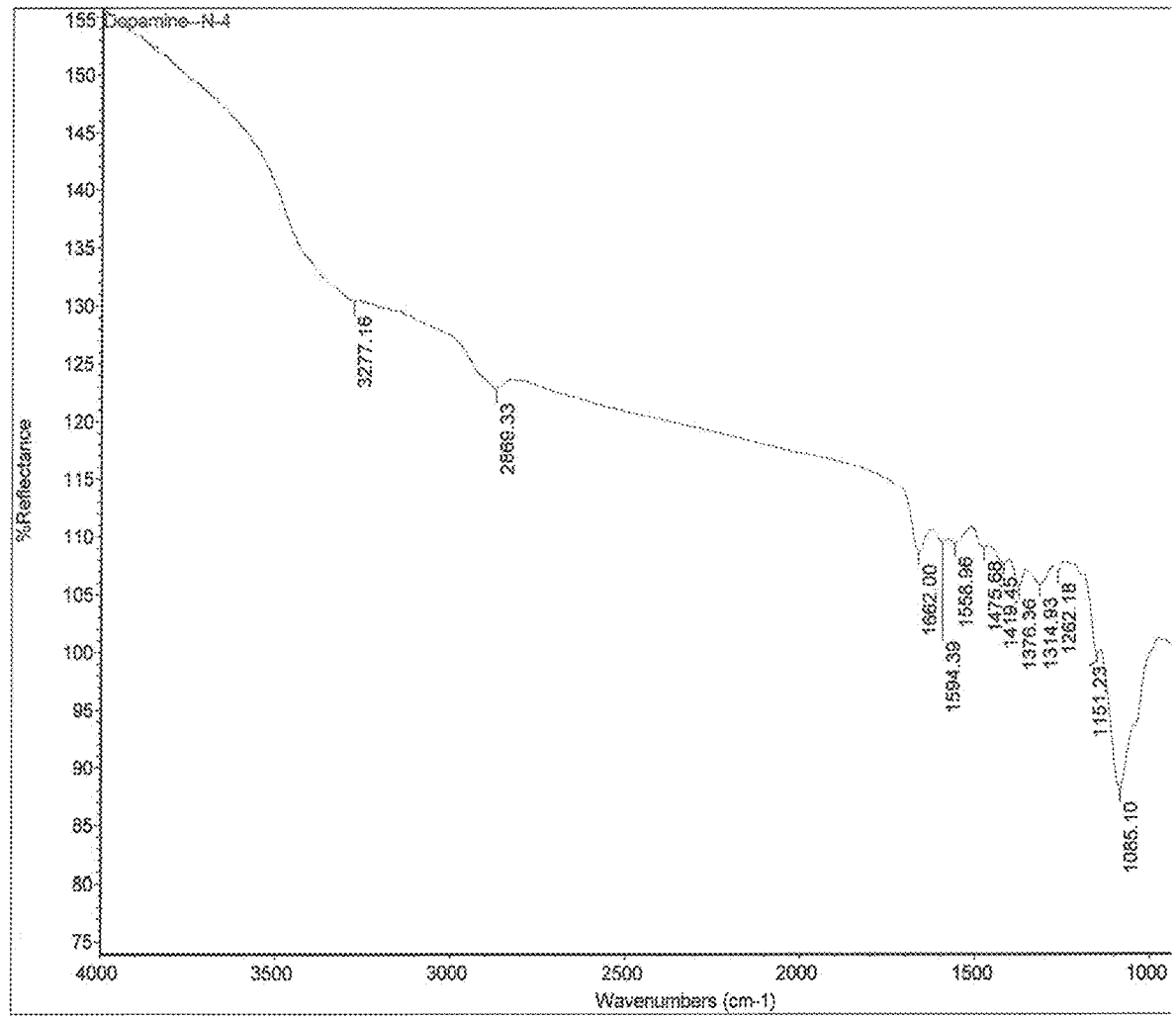
FIG. 3 is an infrared spectrum of a chitosan-modified surface according to an exemplary embodiment.

The spectrum of FIG. 3 shows many of the peaks characteristic of chitosan and oligo-chitosan. The broad peaks around 3277 cm$^{-1}$ are indicative of N—H and O—H stretching, and C—H stretching is indicated by the broad peak around 2869 cm$^{-1}$. Residual acetyl carbonyl stretching is shown at 1662 cm$^{-1}$ and 1376 cm$^{-1}$. 1476 cm$^{-1}$ is indicative of angular bending of the methyl groups of the quaternary ammonium center. Other characteristic peaks are seen at 1151 cm$^{-1}$ and 1085 cm$^{-1}$ correspond to C—O—C and C—O stretching, respectively.

Example 5: Formation of Doubly Conjugated Chitosan 3,4-Dihydroxy hydrocinnamic acid (1 mmol) was dissolved in anhydrous DMSO. Then EDC (1-ethyl-3-(dimethylaminopropyl) carbodiimide) and NHS (N-hydroxysuccinimide) were added to the solution in 1.1 and 1.2 molar ratios of carboxyl groups of dihydroxy hydrocinnamic acid, respectively (the EDC and NHS were equilibrated to room temperature before opening). The mixture was stirred at room temperature for 3 h. The mixture was added dropwise into a 1% quaternized chitosan (N-4 or HTCC) solution (w/v, 300 mg/30 mL DMSO) with stirring. The reaction mixture was stirred overnight at room temperature in the dark. At the end of reaction, a brown precipitate was isolated by centrifugation and washed three times with acetone and DMSO, dialyzed against water with a dialysis tube MWCO=1 kDa (Biodesign, New York) and lyophilized. The solution was washed with acetone. The dopamine-quaternized chitosan (HyCnQ) was dried under vacuum at 25° C. for 72 h. The dopamine-quaternized chitosan were confirmed by $^1$H-NMR (Bruker AC 500 Spectrophotometer, Germany)) and Fourier Transform Infrared (FT-IR) spectroscopy.

Figure 4:
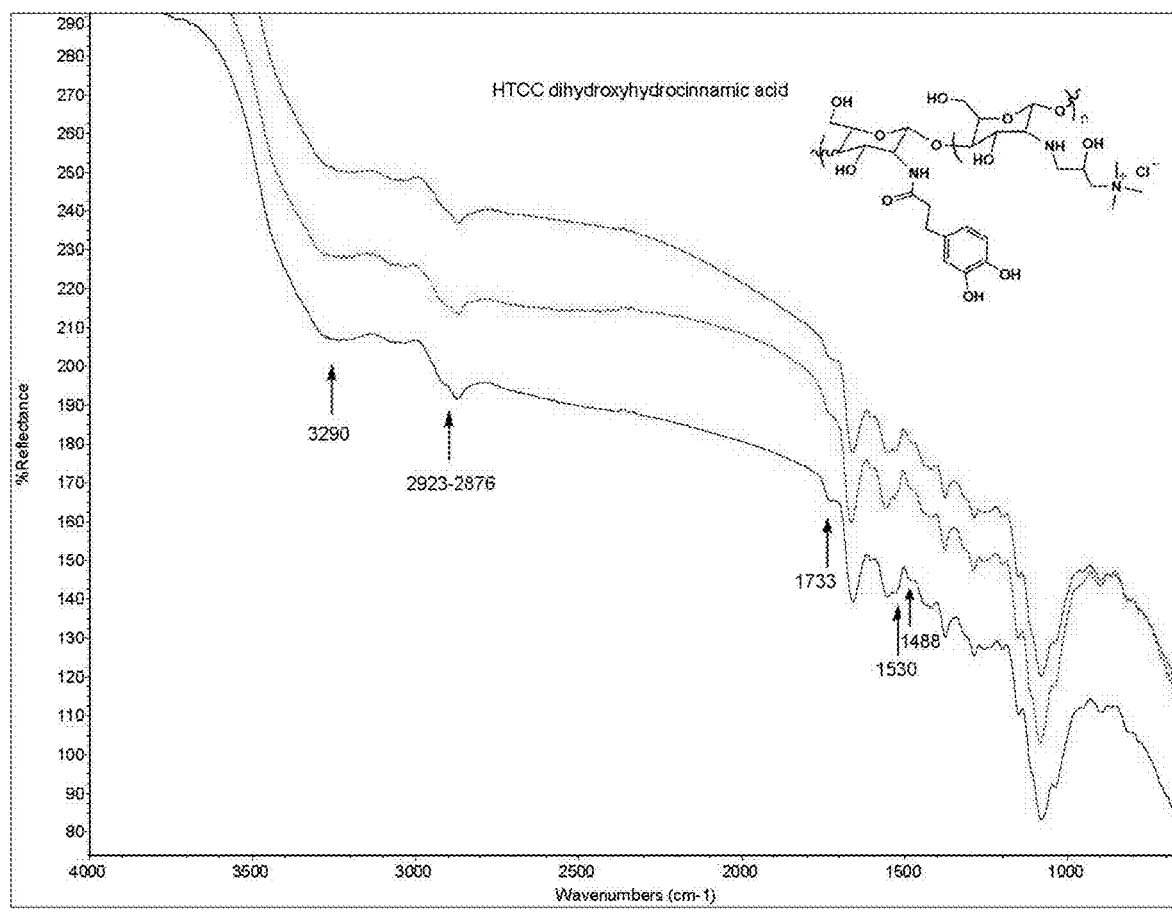
FIG. 4 is an infrared spectrum of a doubly conjugated chitosan oligomer.

FIG. 4 shows characteristic IR spectra of the HyCnQ oligomer. Broad peaks around 3200 cm$^{-1}$ correspond to O—H stretching of the many hydroxyls present. Peaks centered around 2900 cm$^{-1}$ correspond to C—H stretching. Amide formation from attachment of the cinnamic acid is demonstrated by the presence of C=O stretching at 1733 cm$^{-1}$. Also present are secondary amine bending at 1671 cm$^{-1}$, aromatic C=C stretching at 1530 cm$^{-1}$ as well as the methyl bending peak indicative of a quaternary center at 1488 cm$^{-1}$.

Example 6: Surface Attachment of HyCnQ

The dopamine-quaternized chitosan solution (HyCnQ) (0.1 g/10 mL DMSO) was sprayed once onto metal coupons (approximately 0.001 g). Coupons were horizontally placed on the plate to improve the thickness uniformity of coating, then reacted in an oven at 100° C. for 20 minutes. Coupons were removed from the oven and sprayed one more and heated an additional 4 hours in vacuo. In the case of coupons, each side was treated as described above. Coupons were sonicated in EtOH for 5 minutes and dried in vacuo.

Experimental Examples

The antimicrobial properties of the surface-bound chitosan conjugates were characterized via the following experimental examples.

Bacterial Inoculum Preparation: 10 mL of tryptic soy broth (TSB) was inoculated with a single colony of the test organism and incubated overnight at 35+2° C. in a shaking incubator at 250 rpm. The following day, the overnight culture was subcultured into 3 mL TSB and incubated at 35±2° C. and 250 rpm until the optical density at 600 nm reached between 0.5 and 0.7. The subculture was diluted to OD600=0.3 with sterile TSB, and then further diluted to OD600=0.01 with sterile stasis buffer (0.3 mM $KH_2PO_4$, PH 7.2).

Coupon Preparation: Test coupons were prepared as described in Examples 1 to 4. Control and test coupons were sterilized in 70% EtOH for 10 minutes and dried for 10 minutes in a laminar flow hood and transferred to the wells of a 24-well plate.

Experimental Example 1-ASTM E2149 With Low-Volume Modification

Control and test coupons were incubated with 500 µL bacterial inoculum for 1 hour at 35+2° C. and 250 rpm. Bacterial concentrations were determined by performing serial dilutions with stasis buffer and using the Miles and Misra method to determine the number of colony forming units (CFU) per milliliter. All experiments were conducted in triplicate and the log reduction in the average CFU/mL was determined by the following equation:

Log Reduction=log 10(Control CFU/mL)−log 10(Test CFU/mL).

Table 1 lists potency of treated surfaces versus control against Staph aureus (MSSA). As shown in Table 1, in ASTM 2149 as described above, untreated coupons returned on average $2.3\times10^6$ CFU/ml, treated coupons against MSSA returned zero bacteria for a reduction of 5+ logs or better than 99.999%.

TABLE 1

|  | Average | Std. Dev. | Divided by 1.E+06 Average | Std. Dev. |
|---|---|---|---|---|
| Initial Inoc (n = 3) | 2.38E+06 | 1.81E+05 | 2.38 | 0.18 |
| Control (n = 3) | 2.34E+06 | 6.75E+05 | 2.34 | 0.67 |
| MST20-001 (n = 3), 0 cycles | 0.00E+00 | 0.00E+00 | 0 | 0.00 |
| MST20-001 (n = 3), 0 cycles |  |  |  |  |
| Killing Activity |  |  | 100.000 |  |
| Percent Reduction |  |  | 99.999% |  |
| Log Killing |  |  | 5 |  |

Figure 5:
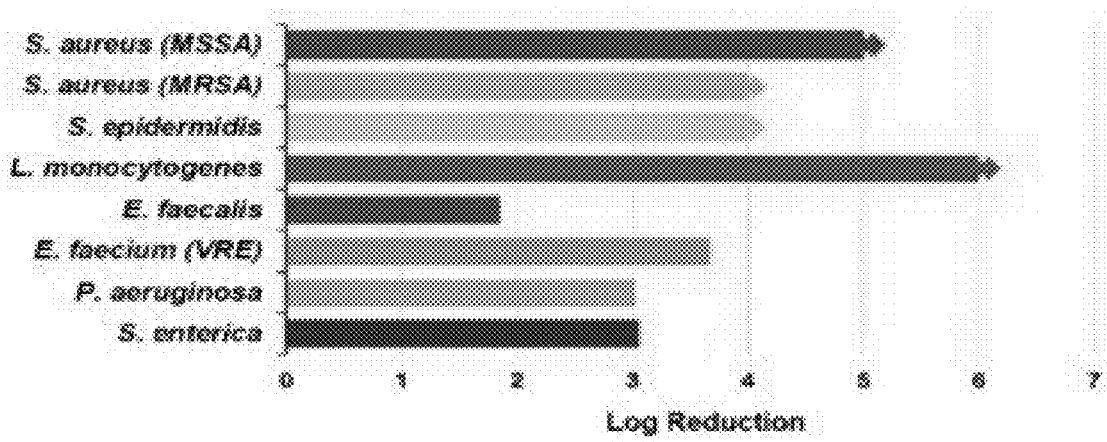
FIG. 5 shows potency data against a number of bacterial species based on the results of the experimental examples of the subject application.

FIG. 5 shows the potency of bound dopamine—N4 against a bacteria panel. MST20-001 was assayed against a variety of bacterial species in the same manner as outlined in Experimental Example 1. The various species assayed against MST20-001 are listed on the left of FIG. 5, and the scale on the bottom tracks log reduction versus control (untreated coupons). For example, in the example above the treated samples returned zero bacteria versus 2.34 E+6 cfu/ml on the controls. Taking into account the initial inoculation, this translates to ~5 logs of killing that can be attributed to the treated coupons. These data correspond to the bar (for S. aureus) across the top of the graph. The arrow at the right of the data bar indicates that zero bacteria were returned from the treated samples and so the potency of the treatment was at least 5 logs.

In an analogous manner, MRSA, S. epidermidis, and L. monocytogenes all returned zero bacteria in the 2149 assay. For E. faecalis, potency was less than 2 logs or between 90 and 99 percent effective. E. faecium was reduced by more that 3 logs or greater than 99.9%, while P. aeruginosa and S. enterica were reduced by 99.9% or by three logs.

Experimental Example 2—Autoclave Tests

Control and test coupons were placed in Chex-All II instant sealing sterilization pouches and autoclaved at 121° C. for 30 minutes (Model HA-300MII, Hirayama Manufacturing Corp., Tokyo, Japan). After each cycle, coupons that were to be autoclaved for more cycles were allowed to cool for about 10 minutes before being transferred to new sterilization pouches. The ASTM E2149 protocol described previously was followed. The results are shown in Table 2, which lists sterilizing testing data based on the results of the experimental examples of the subject application.

TABLE 2

|  | Average | Std. Dev. | Divided by 1.E+06 Average | Std. Dev. |
|---|---|---|---|---|
| Initial Inoc (n = 3) | 2.38E+06 | 1.81E+05 | 2.38 | 0.18 |
| Control (n = 3) | 2.04E+06 | 1.51E+06 | 2.04 | 1.51 |
| MST20-001 (n = 3), 1 cycles | 0.00E+00 | 0.00E+00 | 0 | 0.00 |
| MST20-001 (n = 3), 1 cycles |  |  |  |  |
| Killing Activity |  |  | 100.000 |  |
| Percent Reduction |  |  | 99.999% |  |
| Log Killing |  |  | 5 |  |

As can be seen from the data in Tables 1 and 2, there is no drop off in potency between non-autoclaved (above) and autoclaved treated coupons, which demonstrates good stability of the coating.

Coupon Preparation: Test coupons were prepared as described in Examples 5 to 6. Control and test coupons were sterilized in 70% EtOH for 10 minutes and dried for 10 minutes in a laminar flow hood and transferred to the wells of a 24-well plate.

Experimental Example 3-ASTM E2149 with Low-Volume Modification

Control and test coupons of immobilized HyCnQ were incubated with 500 UL bacterial inoculum for 1 hour at 35+2° C. and 250 rpm. Bacterial concentrations were determined by performing serial dilutions with stasis buffer and using the Miles and Misra method to determine the number of colony forming units (CFU) per milliliter. All experiments were conducted in triplicate and the log reduction in the average CFU/mL was determined by the following equation:

Log Reduction=log 10(Control CFU/mL)−log 10(Test CFU/mL).

Table 3 lists potency of treated surfaces versus control against Staph aureus. As shown in Table 1, in ASTM 2149 as described above, untreated coupons returned on average $2.3\times10^6$ CFU/ml, treated coupons against MSSA returned zero bacteria for a reduction of 6+ logs or better than 99.9999%.

TABLE 3

| | Average | Std. Dev. | Divided by 1.E+06 Average | Std. Dev. |
|---|---|---|---|---|
| Initial Inoc (n = 3) | 1.0E+06 | 1.81E+05 | 1 | 0.18 |
| Control (n = 3) | 1.89E+07 | 3.45E+06 | 18.9 | 3.45 |
| MST21-031 (n = 3), 0.00E+00 0 cycles | 0.00E+00 | 0 | 0.00 | |

| MST21-031 (n = 3), 0 cycles | |
|---|---|
| Killing Activity | 1,000,000 |
| Percent Reduction | 99.9999% |
| Log Killing | 6 |

Although the exemplary embodiments of the present disclosure have been described in detail with reference to the accompanying examples and drawings, the present disclosure is not limited thereto and may be embodied in many different forms without departing from the technical concept of the present disclosure. Therefore, the exemplary embodiments of the present disclosure are provided for illustrative purposes only and are not intended to limit the technical concept of the present disclosure. The protective scope of the present disclosure should be construed based on any appended claims and combinations thereof, and all the technical concepts in the equivalent scope thereof should be construed as falling within the scope of the present disclosure. As various changes could be made in the above methods and compositions without departing from the scope of the invention, it is intended that all matter contained in the above description shall be interpreted as illustrative and not in a limiting sense. Other embodiments within the scope of the claims herein will be apparent to one skilled in the art from consideration of the specification or practice of the invention as disclosed herein. It is intended that the specification be considered exemplary only, with the scope and spirit of the invention being indicated by the claims.

REFERENCES

Feng, Y.; Zheng, Y.; Rahman, Z. U.; Wang, D.; Zhou, F.; Liu, W.; Paper-Based Triboelectric Nanogenerators and Their Application in Self-Powered Anticorrosion and Antifouling, J. Mater. Chem. A, 2016, 4, 18022-18030.

Freitas, E. D., Moura Jr., C. F., Kerwald, J., Beppu, M. M., An Overview of Current Knowledge on the Properties, Synthesis and Applications of Quaternary Chitosan Derivatives, Polymers, 12 (12), 2020, 2878-2919.

Holowka, E. P.; Deming, T. J.; Synthesis and Crosslinking of L-DOPA Containing Polypeptide Vesicles, Macromol. Biosci., 10, 496-502.

Jiang, J.; Zhu, L.; Zhu, L.; Zhang, H.; Zhu, B.; Xu, Y.; Antifouling and Antimicrobial Polymer Membranes Based on Bioinspired Polydopamine and Strong Hydrogen-Bonded Poly(N-vinyl pyrrolidone), ACS Appl. Mater. Interfaces, 2013, 5, 12895-12904.

Kahya, Nilay, Water Soluble Chitosan Derivatives and their Biological Activities: A Review, Polymer Sciences, 2019, 5 (1:3).

Kasprzak, Maria M., Erxleben, A., Ochocki, Justyn, Properties and Applications of Flavonoid Matal Complexes, RCS Adv., 2015, 5, 45853-45877.

Kim, B. H.; Lee, D. H.; Kim, J. Y.; Shin, D. O.; Jeong, H. Y.; Hong, S.; Yun, J. M.; Koo, C. M.; Lee, H.; Kim, S. O.; Mussel-Inspired Block Copolymer Lithography for Low Surface Energy Materials of Teflon, Graphene, and Gold, Adv. Mater., 2011, 23, 5618-5622.

Lee, H.; Dellatore, S. M.; Miller, W. M.; Messersmith, P. B.; Mussel-Inspired Surface Chemistry for Multifunctional Coatings, Science, 2007, 318, 426-430.

Liaqat, Fakhra, Eltem, Rengin, Chitooligosaccharides and their Biological Activities: A Comprehensive Review, Carbohydr Polym. 2018 March 15, 184, 243-259.

Li, P.; Cai, X.; Wang, D.; Chen, S.; Yuan, J.; Li, L.; Shen, J.; Hemocompatibility and Anti-Biofouling Property Improvement of Poly(ethylene Terephthalate) via Self-Polymerization of Dopamine and Covalent Graft of Zwitterionic Cysteine, Colloids Surf. B Biointerfaces, 2013, 110, 327-332.

Li, Si-Dong, Li, Pu-Wang, Yang, Zi-Ming, Peng, Zheng, Quan, Wei-Yan, Yang, Xi-Hong, Yang, Lei, Dong, Jing-Jing, Synthesis and characterization of chitosan quaternary ammonium salt and its application as drug carrier for ribavirin, Drug Delivery, 2014, 21:7, 548-552.

Li, Zhihan, Yang, Fei, yang, Rendang, Synthesis of Chitosan Derivative with Dual-antibacterial Functional Groups and its Antibacterial Activity, Journal of Applied Polymer Science, 2015, 132 (43), 42663-42673.

Liang, R. P.; Meng, X. Y.; Liu, C. M.; Qiu, J. D.; PDMS Microchip Coated with Polydopamine/Gold Nanoparticles Hybrid for Efficient Electrophoresis Separation of Amino Acids, Electrophoresis, 2011, 32, 3331-3340.

Liu, Y.; Ai, K.; Liu, J.; Deng, M.; He, Y.; Lu, L.; Dopamine-Melanin Colloidal Nanospheres: An Efficient Near-Infrared Photothermal Therapeutic Agent for In Vivo Cancer Therapy, Adv. Mater., 2013, 25, 1353-1359.

Lu, Z.; Xiao, J.; Wang, Y.; Meng, M.; In Situ Synthesis of Silver Nanoparticles Uniformly Distributed on Polydopamine-Coated Silk Fibers for Antibacterial Application, J. Colloid Interface Sci., 2015, 452, 8-14.

Lynge, M. E.; Ogaki, R.; Laursen, A. O.; Lovmand, J.; Sutherland, D. S.; Stadler, B.; Polydopamine/Liposome Coatings and Their Interaction with Myoblast Cells, ACS Appl. Mater. Interfaces, 2011, 3, 2142-2147.

Mrowczynski, R.; Bunge, A.; Liebscher, J.; Polydopamine—An Organocatalyst Rather than an Innocent Polymer, Chem. Eur. J, 2014, 20, 8647-8653.

Pardieu, E.; Chau, N. T.; Dintzer, T.; Romero, T.; Favier, D.; Roland, T.; Edouard, D.; Jierry, L.; Ritleng, V.; Polydopamine-Coated Open Cell Polyurethane Foams as an Inexpensive, Flexible yet Robust Catalyst Support: A Proof of Concept, Chem. Commun., 2016, 52, 4691-4693.

Ryu, J. H.; Hong, S.; Lee, H.; Bio-Inspired Adhesive Catechol-Conjugated Chitosan for Biomedical Applications: A Mini Review, Acta Biomater., 2015, 27, 101-115.

Ryu, Ji Hyun; Messersmith, Phillip B.; Lee, Haeshin; Polydopamine Surface Chemistry-A Decade of Discovery, ACS Appl. Mater. Interfaces, 2018, 10, 9, 7523-7540.

Sileika, T. S.; Kim, H. D.; Maniak, P.; Messersmith, P. B.; Antibacterial Performance of Polydopamine-Modified Polymer Surfaces Containing Passive and Active Components, ACS Appl. Mater. Interfaces, 2011, 3, 4602-4610.

Vunain, E., Mishra, A. K., Mamba, B. B., Fundamentals of Chitosan for Biomedical Applications, 2017, 3-30 in Chitosan Based Biomaterials: Volume 1: Fundamentals, Jennings, J. A., Bumgardner, J. D. ed.

Waite, J. H.; Polyphosphoprotein from the Adhesive Pads of Mytilus Edulis, Biochemistry, 2001, 40, 2887-2893.

Wang, H.; Wu, J.; Cai, C.; Guo, J.; Fan, H.; Zhu, C.; Dong, H.; Zhao, N.; Xu, J.; Mussel Inspired Modification of Polypropylene Separators by Catechol/Polyamine for Li-Ion Batteries, ACS Appl. Mater. Interfaces, 2014, 6, 5602-5608.

Wang, X.; Ye, Q.; Gao, T.; Liu, J.; Zhou, F.; Self-Assembly of Catecholic Macroinitiator on Various Substrates and Surface-Initiated Polymerization, Langmuir, 2012, 28, 2574-2581.

Wei, N.; Jiang, Y.; Ying, Y.; Guo, X.; Wu, Y.; Wen, Y.; Yang, H.; Facile Construction of a Polydopamine-Based Hydrophobic Surface for Protection of Metals against Corrosion, RSC Adv., 2017, 7, 11528-11536.

Wei, Y.; Kong, J.; Yang, L.; Ke, L.; Tan, H. R.; Liu, H.; Huang, Y.; Sun, X. W.; Lu, X.; Du, H.; Polydopamine-Assisted Decoration of ZnO Nanorods with Ag Nanoparticles: An Improved Photoelectrochemical Anode, J. Mater. Chem. A, 2013, 1, 5045-5052.

Wu, H.; Kong, J.; Yao, X.; Zhao, C.; Dong, Y.; Lu, X.; Polydopamine-Assisted Attachment of β-Cyclodextrin on Porous Electrospun Fibers for Water Purification under Highly Basic Condition, Chem. Eng. J, 2015, 270, 101-109.

Yang, K.; Lee, J. S.; Kim, J.; Lee, Y. B.; Shin, H.; Um, S. H.; Kim, J. B.; Park, K. I.; Lee, H.; Cho, S. W.; Polydopamine-Mediated Surface Modification of Scaffold Materials for Human Neural Stem Cell Engineering, Biomaterials, 2012, 33, 6952-6964.

Yu, F.; Chen, S.; Chen, Y.; Li, H.; Yang, L.; Chen, Y.; Yin, Y.; Experimental and Theoretical Analysis of Polymerization Reaction Process on the Polydopamine Membranes and Its Corrosion Protection Properties for 304 Stainless Steel, J. Mol. Struct., 2010, 982, 152-161.

Zhang, C.; Yang, H. C.; Wan, L. S.; Liang, H. Q.; Li, H.; Xu, Z. K.; Polydopamine-Coated Porous Substrates as a Platform for Mineralized β-FeOOH Nanorods with Photocatalysis under Sunlight, ACS Appl. Mater. Interfaces, 2015, 7, 11567-11574.

Zhang, W.; Chen, Z.; Mussel Inspired Polydopamine Functionalized Poly(ether Ether Ketone) Tube for Online Solid-Phase Microextraction-high Performance Liquid Chromatography and Its Application in Analysis of Protoberberine Alkaloids in Rat Plasma, J. Chromatogr. A, 2013, 1278, 29-36.

The invention claimed is:

1. A composition comprising a substrate and a chitosan polymer or oligomer having a general formula

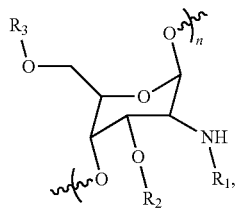

wherein n ranges from 1 to about 300;

each of $R_1$, $R_2$, $R_3$ is independently selected from a thiol, an alkane, an alkene, an alkyne, a secondary amine, a nitrile, an aldehyde, an imidazole, an azide, a halide, a polyhexamethylene dithiocarbonate, a hydrogen, a hydroxyl, a carboxylic acid, an aldehyde, a carboxylic ester, a carboxamide, a urea, a catechol, a quaternary ammonium, a quaternary phosphonium, a quaternary pyridinium, or combinations thereof;

at least one of the $R_1$, $R_2$, and $R_3$ groups in the polymer or oligomer comprises the quaternary ammonium, the quaternary phosphonium, or the quaternary pyridinium;

the chitosan polymer or oligomer has between about 1 to about 99% quaternization; and at least one of the $R_1$ groups in the polymer or oligomer is a substituted or unsubstituted dopamine or a derivative thereof, wherein the dopamine or derivative thereof is bound to the substrate, and wherein the dopamine or derivative thereof is bound to the chitosan polymer or oligomer via a —NH—C(O)— group which forms a —NH—C(O)—NH— group in combination with the —NH— group that is bound between $R_1$ and the chitosan pyranose ring.

2. The composition of claim 1, where the quaternary ammonium substituent is 2-hydroxypropyl trimethylammonium.

3. The composition of claim 1, wherein the substrate is a metal surface comprising at least one selected from the group consisting of titanium, hafnium, cobalt chrome, stainless steel, iron, copper, zinc, aluminum, tantalum, zirconium, silicon, gold, and silver, and alloys and oxides thereof.

4. The composition of claim 3, where the metal substrate is titanium, aluminum, cobalt chrome, or an alloy thereof.

5. The composition of claim 4, wherein the metal substrate comprises a metal oxide to which the substituted or unsubstituted catechol is attached.

6. The composition of claim 3, wherein the metal is stainless steel.

7. The composition of claim 3, wherein the metal is titanium.

8. The composition of claim 3, wherein the metal is cobalt chrome.

9. The composition of claim 3, wherein the metal substrate is the surface of a medical device.

10. A method of preparing the composition according to claim 1, the method comprising:
   a. reacting a quaternized chitosan polymer or oligomer with a substituted or unsubstituted catechol to obtain a catechol-modified doubly conjugated chitosan;
   b. immersing at least a portion of a metal substrate into a non-aqueous protic solution of the catechol-modified doubly conjugated chitosan; and
   c. attaching the catechol-modified doubly conjugated chitosan to the substrate, to form the composition of claim 1.

11. The method according to claim 10, wherein the non-aqueous protic solvent is methanol or ethanol.

12. The method according to claim 10, wherein step c. comprises heating, exposure to UV radiation or anodization.

13. The method according to claim 10, where the quaternary ammonium substituent is 2-hydroxypropyl trimethylammonium.

14. The method according to claim 10, wherein the substrate is a metal surface comprising at least one selected from the group consisting of titanium, hafnium, cobalt chrome, stainless steel, iron, copper, zinc, aluminum, tantalum, zirconium, silicon, gold, and silver, and alloys and oxides thereof.

15. The method according to claim 14, where the metal substrate is titanium, aluminum, cobalt chrome, titanium, or an alloy thereof.

16. The method according to claim 14, wherein the metal substrate comprises a metal oxide to which the catechol is attached.

* * * * *